United States Patent [19]

Sekine et al.

[11] Patent Number: 5,854,987
[45] Date of Patent: Dec. 29, 1998

[54] VEHICLE STEERING CONTROL SYSTEM USING NAVIGATION SYSTEM

[75] Inventors: Hiroshi Sekine; Nobuyoshi Asanuma, both of Saitama, Japan

[73] Assignee: Honda Giken Kogyo Kabushiki Kaisha, Tokyo, Japan

[21] Appl. No.: 620,193

[22] Filed: Mar. 22, 1996

[30] Foreign Application Priority Data

| Mar. 23, 1995 | [JP] | Japan | 7-064584 |
| Mar. 23, 1995 | [JP] | Japan | 7-064585 |
| Mar. 24, 1995 | [JP] | Japan | 7-066247 |

[51] Int. Cl.$^6$ ............ G01C 21/20; B62D 6/00
[52] U.S. Cl. ............ 701/41; 701/208; 180/443
[58] Field of Search ............ 701/208, 213, 701/205, 41, 23; 180/443, 446

[56] References Cited

U.S. PATENT DOCUMENTS

| 5,504,482 | 4/1996 | Schreder | 340/995 |
| 5,563,786 | 10/1996 | Torii | 364/424.02 |
| 5,588,733 | 12/1996 | Gotou | 362/37 |
| 5,661,650 | 8/1997 | Sekine et al. | 364/424.027 |
| 5,703,780 | 12/1997 | Takanabe et al. | 364/449.3 |

*Primary Examiner*—Michael Zanelli
*Attorney, Agent, or Firm*—Carrier, Blackman & Associates, P.C.; Joseph P. Carrier; William D. Blackman

[57] ABSTRACT

An azimuth change quantity $\theta$ of a road during traveling of a vehicle for a time $\delta t$ is calculated based on road data provided by a navigation system and a vehicle speed provided by a vehicle speed sensor (at step S3 in FIG. 2). On the other hand, an azimuth change quantity $\Theta$ of the vehicle is calculated by integrating a yaw rate $\gamma$ obtained from a yaw rate sensor over the time $\delta t$ (at step S5). A deviation D between the azimuth change quantity $\theta$ of the road and the azimuth change quantity $\Theta$ of the vehicle is calculated (at step S6). When the deviation D becomes equal to or larger than a reference value $\beta$, it is determined that there is a possibility that the vehicle will depart from the road (at step S9), and a predetermined steering torque is applied to a steering device, so that the deviation is converged into zero (at steps S10 and S11).

18 Claims, 28 Drawing Sheets

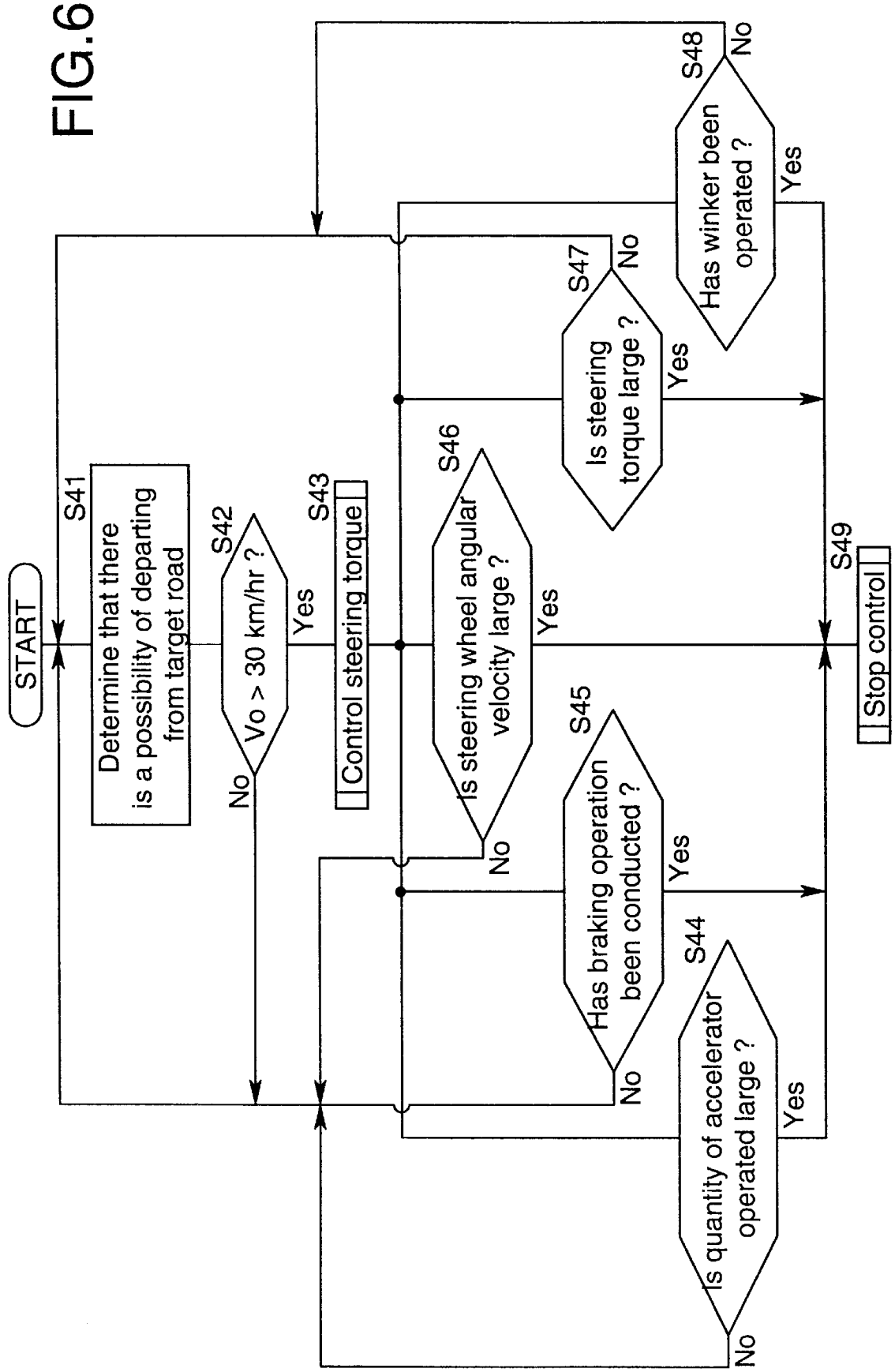

When vehicle speed is low

When vehicle speed is high

VEHICLE STEERING CONTROL SYSTEM USING NAVIGATION SYSTEM

BACKGROUND OF THE INVENTION

1. Field of the Invention

The present invention relates to a vehicle control system for performing a steerage control based on an azimuth change quantity of a road calculated from map information and a position of a subject vehicle.

2. Description of the Related Art

There is a technique conventionally known from Japanese Patent Application Laid-open No.89298/85, which determines whether the subject vehicle can pass through a curve existing ahead of the subject vehicle in a traveling direction at a current vehicle speed, by estimating a radius of curvature of the curve based on map data obtained by a navigation system, and gives a warning to a driver, when it is determined that the subject vehicle cannot pass through the curve.

In the above known technique, however, it is only determined whether the vehicle can pass through the curve at the current vehicle speed, and a misalignment of the vehicle from the curvature of the road is not detected, resulting in a problem that a proper warning is difficult. Moreover, even if a warning is given when the driver has a lowered driving capability due to a fatigue or when the driver is inattentively driving the vehicle, a driver's quick steering or braking operation is required to avoid the departing of the vehicle from the road, and an unskilled driver cannot cope with such operation, resulting in a possibility that the vehicle will depart from the road.

There are conventionally proposed various follow-up travel control systems which are designed to detect a vehicle traveling ahead of a subject vehicle (which will be referred to as an ahead-traveling vehicle hereinafter) by radar or the like and perform a vehicle-vehicle distance control so that a distance between the subject vehicle from the ahead-traveling vehicle is maintained constant. However, if a control for preventing the departing of the vehicle from the road and a follow-up travel control for permitting the vehicle to travel while following the ahead-traveling vehicle are conducted simultaneously, for example, if a steerage control started when the driver is conducting the steerage to cause the subject vehicle to trace a travel locus of the ahead-traveling vehicle during the follow-up travel control, it is considered that the driver feels a sense of incompatibility. If the arrangement is such that both of the controls are switched from one to another at each time by a manual operation, for example, when the driver has lost sight of the ahead-traveling vehicle during the follow-up travel control, the following problems are encountered: the driver may forget the switching-over to the control for preventing the departing of the subject vehicle from the road, and such switching-over is troublesome for the driver.

There is also a technique known from Japanese Patent Application Laid-open No.5-113822, which detects an obstacle existing ahead of the subject vehicle on a travel road by a video camera or radar, and conducts a vehicle speed control or a steerage control to avoid the collision of the subject vehicle against the obstacle, when it is determined that there is a possibility of the collision of the vehicle against the obstacle.

If the obstacle-avoiding control system is combined with the steerage control system designed to determine whether there is a possibility of the departing of the vehicle from the road, based on the traveling state of the vehicle and the shape of a road district existing ahead of a subject-vehicle position on a travel road, and to apply a steering torque to a steering means, when it is determined that there is the possibility of the departing of the vehicle from the road, thereby preventing the departing of the vehicle from the road, the following problem is encountered: both of the controls interfere with each other to make it difficult to perform a smooth avoidance of the obstacle.

Specifically, when the driver conducts the steerage to avoid the obstacle, the vehicle departs from an intrinsic course and hence, the steerage control system applies a steering torque to the steering means to return the vehicle to the original course. However, this steering torque is in a direction opposite from a direction of a steering torque applied by the driver to avoid the obstacle, and hence, there is a possibility that the burden of the driver's obstacle-avoiding operation is increased and that a sense of incompatibility is imparted.

SUMMARY OF THE INVENTION

Accordingly, it is a first object of the present invention to subject the steering device to a steerage control to reliably avoid the departing of the vehicle from the road.

It is a second object of the present invention to reconcile both of the control for preventing the departing of the vehicle from the road and the follow-up travel control for allowing the vehicle to travel while following the ahead-traveling vehicle.

It is a third object of the present invention to allow the driver to easily perform an obstacle-avoiding operation while conducting the steerage control for preventing the departing of the vehicle from the road.

To achieve the above first object, according to the present invention, there is provided a vehicle control system comprising: a map information outputting means for outputting map information including a road on which a subject vehicle travels; a subject-vehicle position detecting means for detecting a subject-vehicle position on a map; a steering means for steering a steering control wheel of the vehicle; a steering-torque applying means for applying a steering torque to the steering means; and a control means for determining a deviation between an azimuth change quantity of the road on which the vehicle is traveling and an azimuth change quantity of the vehicle, and for driving the steering-toque applying means such as to decrease the deviation.

With such arrangement, the deviation between an azimuth change quantity of the road on which the vehicle is traveling and an azimuth change quantity of the vehicle, is determined, and the steering torque is applied to the steering means in the direction to decrease the deviation. Therefore, even when the driver has a lowered driving capability, the possibility of the departing of the vehicle from the road can be reduced remarkably.

To achieve the first object, according to the present invention, there is provided a vehicle control system comprising: a map information outputting means for outputting map information including a road on which a subject vehicle travels; a subject-vehicle position detecting means for detecting a subject-vehicle position on a map; a steering means for steering a steering control wheel of the vehicle, a steering-torque applying means for applying a steering torque to the steering means; and a control means for determining a required steering torque based on an azimuth change quantity of the road on which the vehicle is traveling, and for driving the steering-torque applying means based on the steering torque.

With the above arrangement, the required steering torque is determined based on the azimuth change quantity of the road on which the vehicle is traveling, and a steering torque is applied to the steering means based on such required steering torque. Therefore, even if the driver has a lowered driving capability, the possibility of the departing of the vehicle from the road can be reduced remarkably.

To achieve the first object, according to the present invention, there is provided a vehicle control system comprising: a map information outputting means for outputting map information including a road on which a subject vehicle travels; a subject-vehicle position detecting means for detecting a subject-vehicle position on a map; a warning indicating means for giving a warning to a driver; and a control means for determining a deviation between an azimuth change quantity of the road on which the vehicle is traveling and an azimuth change quantity of the vehicle, and for driving the warning indicating means based on the deviation.

With the above arrangement, the deviation between the azimuth change quantity of the road on which the vehicle is traveling and the azimuth change quantity of the vehicle, and the warning is given to the driver based on the deviation. Therefore, even if the driver has a lowered driving capability, the possibility of the departing of the vehicle from the road can be reduced remarkably.

To achieve the first object, according to the present invention, there is provided a vehicle control system comprising: a map information outputting means for outputting map information including a road on which a subject vehicle travels; a subject-vehicle position detecting means for detecting a subject-vehicle position on a map; a steering means for steering a steering control wheel of the vehicle; a steering-torque applying means for applying a steering torque to the steering means; a reference yaw rate determining means for estimating a yaw rate generated during traveling of the vehicle based on the shape of a road ahead of the subject-vehicle position on the travel road to determine the estimated yaw rate as a reference yaw rate; an actual yaw rate detecting means for detecting an actual yaw rate; and a control means for determining a deviation between the reference yaw rate and the actual yaw rate to drive the steering-torque applying means such as to decrease the deviation.

With the above arrangement, the deviation between the reference yaw rate based on the an azimuth change quantity of the road on which the vehicle is traveling and the actual yaw rate of the vehicle, is determined, and the steering torque is applied to the steering means in the direction to decrease the deviation. Therefore, even if the driver has a lowered driving capability, the possibility of the departing of the vehicle from the road can be reduced remarkably.

To achieve the second object, according to the present invention, there is provided a vehicle control system comprising: a map information outputting means for outputting map information including a road on which a subject vehicle travels; a subject-vehicle position detecting means for detecting a subject-vehicle position on a map; a traveling state detecting means for detecting a traveling state of the vehicle; a steering means for steering a steering control wheel of the vehicle; a steering-torque applying means for applying a steering torque to the steering means; a steerage control means for determining a steering-toque application quantity based on the traveling state of the vehicle and the shape of a road ahead of the subject-vehicle position on the travel road to drive the steering-torque applying means based on the steering-torque application quantity; an ahead-traveling vehicle detecting means for detecting a distance between the subject vehicle and an ahead-traveling vehicle and/or a relative speed of the subject vehicle relative to the ahead-traveling vehicle; a follow-up travel control means for controlling the distance between the subject vehicle and the ahead-traveling vehicle to allow the subject vehicle to travel while following the ahead-traveling vehicle in accordance with the distance between the subject vehicle and the ahead-traveling vehicle and/or the relative speed of the subject vehicle relative to the ahead-traveling vehicle; and a control switch-over means which discontinues a steerage control by the steerage control means when a follow-up control by the follow-up control means is started during the steerage control, and which starts the steerage control by the steerage control means when the vehicle control system fails to detect the ahead-traveling vehicle during the follow-up travel control by the follow-up travel control means.

With the above arrangement, when the follow-up travel control by the follow-up travel control means is started during the steerage control by the steerage control means, the steerage control is discontinued, and when the ahead-traveling vehicle is failed to be detected during the follow-up travel control by the follow-up travel control means, the steerage control is started. Therefore, it is possible to exhibit the functions of both the follow-up travel control and the steerage control without causing the driver to feel a sense of incompatibility and a troublesomeness due to a mutual interference of the follow-up travel control and the steerage control.

To achieve the second object, according to the present invention, there is provided a vehicle control system comprising: a map information outputting means for outputting map information including a road on which a subject vehicle travels; a subject-vehicle position detecting means for detecting a subject-vehicle position on a map; a vehicle speed detecting means for detecting a vehicle speed; a passability or impassability determining means for determining whether the vehicle can pass through a road ahead of the subject-vehicle position, based on the vehicle speed and the shape of the road ahead of the subject-vehicle position; a vehicle speed control means for controlling the vehicle speed based on the determination by the passability or impassability determining means; an ahead-traveling vehicle detecting means for detecting a distance between the subject vehicle and an ahead-traveling vehicle and/or a relative speed of the subject vehicle relative to the ahead-traveling vehicle; a follow-up travel control means for controlling the distance between the subject vehicle and the ahead-traveling vehicle to allow the subject vehicle to travel while following the ahead-traveling vehicle in accordance with the distance between the subject vehicle and the ahead-traveling vehicle and/or the relative speed of the subject vehicle relative to the ahead-traveling vehicle; and a control switch-over means which discontinues a vehicle speed control by the vehicle speed control means when a follow-up control by the follow-up control means is started during the vehicle speed control by the vehicle speed control means, and which starts the vehicle speed control by the vehicle speed control means when the vehicle control system fails to detect the ahead-traveling vehicle during the follow-up travel control by the follow-up travel control means.

With the above arrangement, when the follow-up control by the follow-up control means is started during the vehicle speed control by the vehicle speed control means, the vehicle speed control is discontinued and when the ahead-traveling vehicle is failed to be detected during the follow-up travel control by the follow-up travel control means, the vehicle speed control by the vehicle speed control means is started. Therefore, it is possible to exhibit the functions of both the vehicle speed control and the follow-up travel control without causing the driver to feel a sense of incompatibility and a troublesomeness due to a mutual interference of the vehicle speed control and the follow-up travel control.

To achieve the third object, according to the present invention, there is provided a vehicle control system comprising: a map information outputting means for outputting map information including a road on which a subject vehicle travels; a subject-vehicle position detecting means for detecting a subject-vehicle position on a map; a steering means for steering a steering control wheel of the vehicle; a steering-torque applying means for applying a steering torque to the steering means; a steering angular velocity detecting means for detecting a steering angular velocity input to the steering means; and a steerage control means which determines a steering-torque application quantity based on a traveling state of the vehicle and the shape of a road ahead of the subject-vehicle position on the travel road to drive the steering-torque applying means, and which corrects the steering-torque application quantity, when a steering angular velocity equal to or larger than a predetermined value is detected by the steering angular velocity detecting means.

With the above arrangement, when the driver has found an obstacle ahead and has conducted an obstacle avoiding operation while preventing the departing of the vehicle from the road by applying the steering torque to the steering means based on the traveling state of the vehicle and the shape of the road district ahead of the subject-vehicle position, the steering torque can be corrected to reliably conduct the avoiding operation. At this time, it can be detected based on the magnitude of the steering angular velocity that the driver has conducted the avoiding operation.

To achieve the third object, according to the present invention, there is provided a vehicle control system comprising: a map information outputting means for outputting map information including a road on which a subject vehicle travels; a subject-vehicle position detecting means for detecting a subject-vehicle position on a map; a steering means for steering a steering control wheel of the vehicle; a steering-torque applying means for applying a steering torque to the steering means; an ahead-obstacle detecting means for detecting an obstacle ahead of the vehicle; a side-obstacle detecting means for detecting an obstacle sideways of the vehicle; and a steerage control means which determines a steering-torque application quantity based on a traveling state of the vehicle and the shape of a road ahead of the subject-vehicle position on the travel road to drive the steering-torque applying means, and which corrects the steering-torque application quantity such as to avoid an obstacle ahead of the subject vehicle if such an obstacle is detected by the ahead-obstacle detecting means, and corrects the steering-torque application quantity in a direction reverse from the direction to avoid the obstacle, if the side-obstacle detecting means detects that the subject vehicle has avoided the obstacle.

With the above arrangement, the avoidance of the obstacle and the returning of the vehicle to a travel lane can be reliably performed by correcting the steering torque in the direction to avoid the obstacle, if the obstacle has been detected ahead by the ahead-obstacle detecting means, and by correcting the steering torque in the direction reverse from the direction to avoid the obstacle if it is detected by the side-obstacle detecting means that the subject vehicle has avoided the obstacle, while preventing the departing of the subject vehicle from the road by applying the steering torque to the steering means based on the traveling state of the vehicle and the shape of the road district existing ahead of the subject-vehicle position on the travel road.

The above and other objects, features and advantages of the invention will become apparent from the following detailed description of preferred embodiments taken in conjunction with the accompanying drawings.

BRIEF DESCRIPTION OF THE DRAWINGS

FIG. 6 is a flowchart according to a fourth embodiment of the present invention;

Each of step numbers used in each of the embodiments is concluded in the embodiment, and even if the same step numbers are used in different embodiments, the contents thereof are not necessarily the same.

DETAILED DESCIPTION OF THE PREFERRED EMBODIMENTS

Figure 1:
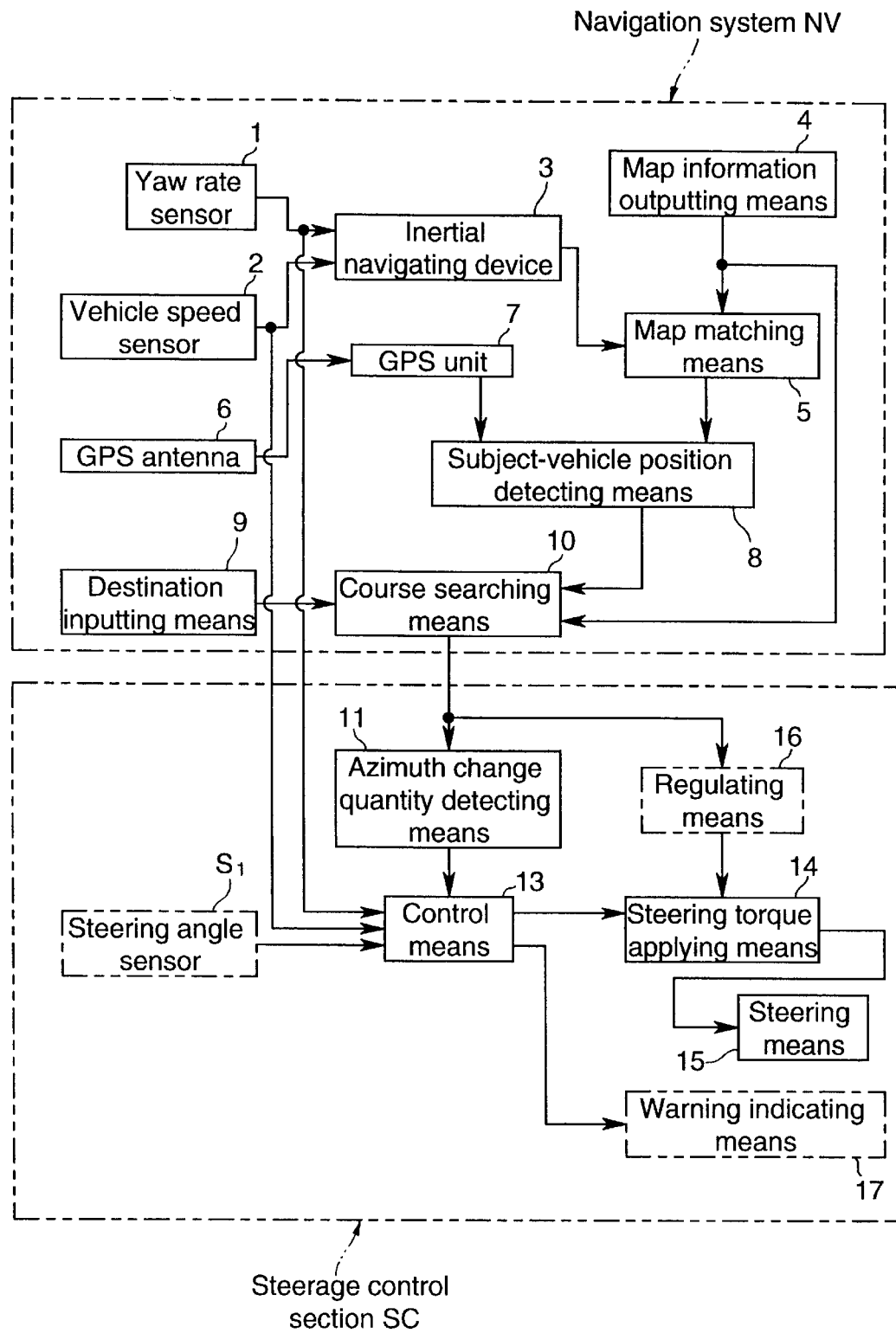
FIG. 1 is a block diagram showing the entire arrangement of a vehicle control system according to a first embodiment of the present invention.

First, a first embodiment of the present invention will now be described with reference to FIGS. 1 to 3. Referring to FIG. 1, reference character NV is a navigation system for a vehicle. The navigation system NV includes an inertial navigating device 3 into which signals from a yaw rate sensor 1 and a vehicle speed sensor 2 are input, a map information outputting means 4 using an IC card or CD-ROM, and a map matching means 5 for superposing a travel locus along which a subject vehicle travels and which is output by the inertial navigating device 3, onto a map information output by the map information outputting means 4. The navigation system NV further includes a GPS unit 7 into which a signal from a GPS antenna 6 is input, a subject-vehicle position detecting means 8 for detecting the position of the subject vehicle based on position coordinates output by the map matching means 5 and position coordinates output by the GPS unit 7, and a course searching means 10 for searching a course to a destination based on destination coordinates from a destination inputting means 9 and subject-vehicle position coordinates from the subject-vehicle position detecting means 8.

Reference character SC is a steerage control section. The steerage control section SC includes an azimuth detecting means 11 for detecting an azimuth change quantity θ of a road ahead of the subject vehicle, based on a signal from the course searching means 10, a control means 13 which determines whether there is a possibility of the departing of the vehicle from a road, based on signals from the yaw rate sensor 1, the vehicle speed sensor 2, a steering angle sensor $S_1$ and the azimuth detecting means 11, a steering torque applying means 14 for applying a predetermined steering torque to a steering means 15 for steering a steering control wheel, based a signal from the control means 13, a warning indicating means 17 such as a buzzer, a chime, a lamp, a display and the like for giving a warning to a driver, based on the signal from the control means 13, and a regulating means 16 for regulating the motion of the steering torque applying means 14, based on the signal from the course searching means 10. The steering torque applying means 14 is, for example, an actuator for an electric power-steering device, or the like.

Among the above-described various means, the steering angle sensor $S_1$, the regulating means 16 and the warning indicating means 17, which are surrounded by a dashed line, are not used in the first embodiment and a second embodiment. The steering angle sensor $S_1$ and the warning indicating means 17 are used in a third embodiment, and the regulating means 16 is used in a fifth embodiment.

The operation of the first embodiment of the present invention will be described below with reference to a flowchart in FIG. 2.

First, it is determined based on an output from the course searching means 10 whether there is a curve in a road within a predetermined range ahead of the subject vehicle (step S1). If the answer at step S1 is YES to indicate that there is a curve, a yaw rate γ is read from the yaw rate sensor 1 to conduct a steerage control suitable for the passage of the vehicle through such curve; a vehicle speed $V_0$ is read from the vehicle sensor 2, and road data are read from the course searching means 8 (step S2).

Figure 3:
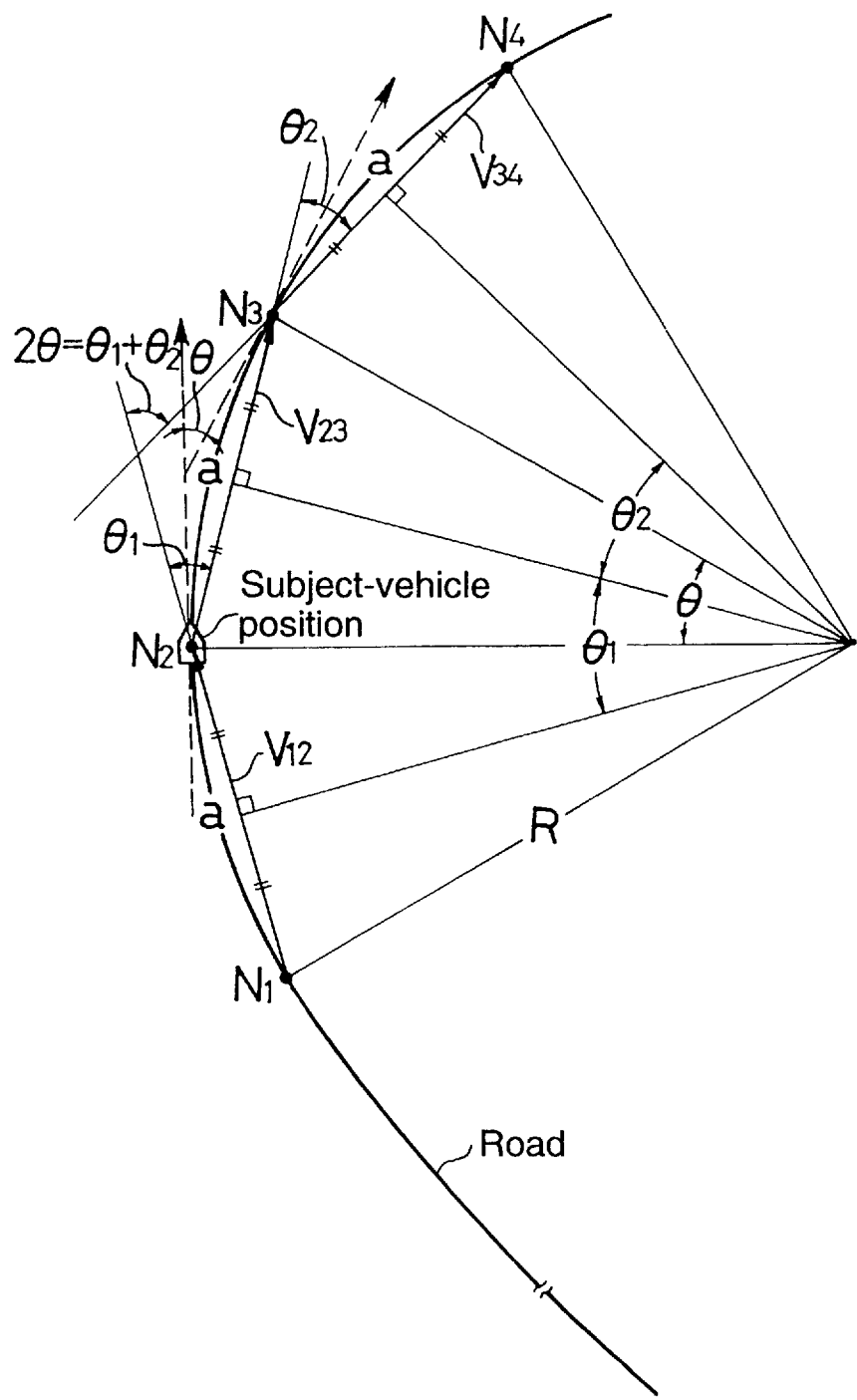
FIG. 3 is a diagram for explaining a method for determining an azimuth change quantity of a road.

As can be seen from FIG. 3, the road ahead of the subject vehicle, which has been searched by the course searching means 10, is comprised of a set of a large number of nodes N, and first, second, third and fourth reference nodes $N_1$, $N_2$, $N_3$ and $N_4$ are selected from the set of the nodes. At this time, the second reference node $N_2$ is set at the position of the subject vehicle detected by the subject-vehicle position detecting means 8; the first reference node $N_1$ is set at a position short of the second reference node $N_2$ by a distance $\underline{a}$; the third reference node $N_3$ is set at a position ahead of the second reference node $N_2$ by a distance $\underline{a}$; and the fourth reference node $N_4$ is set at a position ahead of the third reference node $N_3$ by a distance $\underline{a}$. Here, $\underline{a}$ is determined as a product of the vehicle speed $V_0$ and a predetermined time $t_1$ ($a=V_0 \times t_1$).

By determining the distance a between the reference nodes $N_1$, $N_2$, $N_3$, $N_4$ in the above manner, the distance between the reference nodes $N_1$, $N_2$, $N_3$ and $N_4$, when the vehicle speed $V_0$ is large, can be determined at a large value to insure calculating time enough to calculate the azimuth change quantity θ of the road which will be described hereinafter.

When no node N exists at a temporary position of the subject vehicle or at a position established by a multiple of the distance $\underline{a}$ on the basis of a temporary position of the subject vehicle, the node N nearest to such position is extracted as the reference node $N_1$, $N_2$, $N_3$, $N_4$. When the data for the node N is sparse and no node N exists in a range of the distance $\underline{a}$, four consecutive nodes N are extracted as the reference nodes $N_1$, $N_2$, $N_3$ and $N_4$.

Provided that the road is of a curved shape and four reference nodes $N_1$, $N_2$, $N_3$ and $N_4$ exist substantially on an arc, a quantity θ of azimuth change from the second reference node $N_2$ which is the position of the subject vehicle to the next third reference node $N_3$ is determined in the azimuth change quantity detecting means 11 in the following manner:

First, the following vectors are calculated: a vector $V_{12}$ ($X_{12}$, $Y_{12}$) connecting the first reference node $N_1$ ($X_1$, $Y_1$) and the second reference node $N_2$ ($X_2$, $Y_2$); a vector $V_{23}$ ($X_{23}$, $Y_{23}$) connecting the second reference node $N_2$ ($X_2$, $Y_2$) and the third reference node $N_3$ ($X_3$, $Y_3$); and a vector $V_{34}$ ($X_{34}$, $Y_{34}$) connecting the third reference node $N_3$ ($X_3$, $Y_3$) and the fourth reference node $N_4$ ($X_4$, $Y_4$).

At this time, if an angle formed by the vectors $V_{12}$ and $V_{23}$ is represented by $\theta_1$, an equation, $$X_{12} \times X_{23} + Y_{12} \times Y_{23} = (X_{12}^2 + Y_{12}^2)^{1/2} \times (X_{23}^2 + Y_{23}^2)^{1/2} \times \cos\theta_1 \qquad (1)$$

is established from an inner product of the vectors $V_{12}$ and $V_{23}$, and the angle $\theta_1$ is calculated from this equation.

In addition, if an angle formed by the vectors $V_{23}$ and $V_{34}$ is represented by $\theta_2$, an equation, $$X_{23} \times X_{34} + Y_{23} \times Y_{34} = (X_{23}^2 + Y_{23}^2)^{1/2} \times (X_{34}^2 + Y_{34}^2)^{1/2} \times \cos\theta_2 \qquad (2)$$

is established from an inner product of the vectors $V_{23}$ and $V_{34}$, and the angle $\theta_2$ is calculated from this equation.

Thus, a quantity $\theta$ of azimuth change from the second reference node $N_2$ to the third reference node $N_3$ is given from an equation, $$\theta=(\theta_1+\theta_2)/2 \qquad (3)$$

When the azimuth change quantity $\theta$ of the road (i.e., the quantity $\theta$ of azimuth change between the second and third nodes $N_2$ and $N_3$) is calculated in the above manner, steps S4 to S10 which will be described below are then carried out in the control means 13.

When a time $\delta t$ has been lapsed and the vehicle has reached the third node $N_3$ from the second node $N_2$ (at step S4), an azimuth change quantity $\Theta$ of the vehicle is calculated by integrating the yaw rate $\gamma$ from $t=0$ to $t=\delta t$ in the control means 13 (at step S5) The azimuth change quantity $\Theta$ of the vehicle corresponds to a quantity of change in yaw angle while the vehicle reaches the third node $N_3$ from the second node $N_2$. Then, a deviation $D$ $(=|\theta-\Theta|)$ between the azimuth change quantity $\theta$ of the road determined at step S3 and the azimuth change quantity $\Theta$ of the vehicle determined at step S5 is calculated (at step S6). The deviation $D$ is compared with a reference value $\beta$ which is determined in accordance with the width $W$ of the road (at step S7). The reference value $\beta$ can be determined according to the following expression, as a value which ensures that the vehicle does not depart from the road having a width $W$, for example, while the vehicle is traveling over the distance $a$ from the second reference node $N_2$ to the third reference node $N_3$.

$$A \times \beta < W/2 \qquad (4)$$

If the answer at step S7 is YES indicate that the deviation $D$ is smaller than the reference value $\beta$, it is determined that there is no possibility that the vehicle will depart from the road, and the steerage control is not conducted (at step S8). On the other hand, if the answer at step S7 is NO to indicate that the deviation $D$ is equal to or larger than the reference value $\beta$, it is determined that there is a possibility that the vehicle will depart from the road, and a steering torque for converging the deviation $D$ to zero is calculated (at steps S9 and S10). The steering torque applying means 14 is allowed to act on the steering means 15 by the steering torque, thereby facilitating the returning of the vehicle to the travel line by a driver (at steps S11 and S12). The execution of such a feedback control ensures that even if the driver is unskilled in driving technique, or if a driver's driving capability is lowered due to a fatigue or the like, it is facilitated for the azimuth change quantity $\Theta$ of the vehicle to automatically follow the azimuth change quantity $\theta$ of the road, whereby the possibility of the departing of the vehicle from the road can be remarkably reduced.

A second embodiment of the present invention will now be described with reference to a flowchart in FIG. 4. In the first embodiment, the steering means 15 is feedback-controlled, whereas the steering means 15 is feedforward-controlled in the second embodiment.

Figure 2:
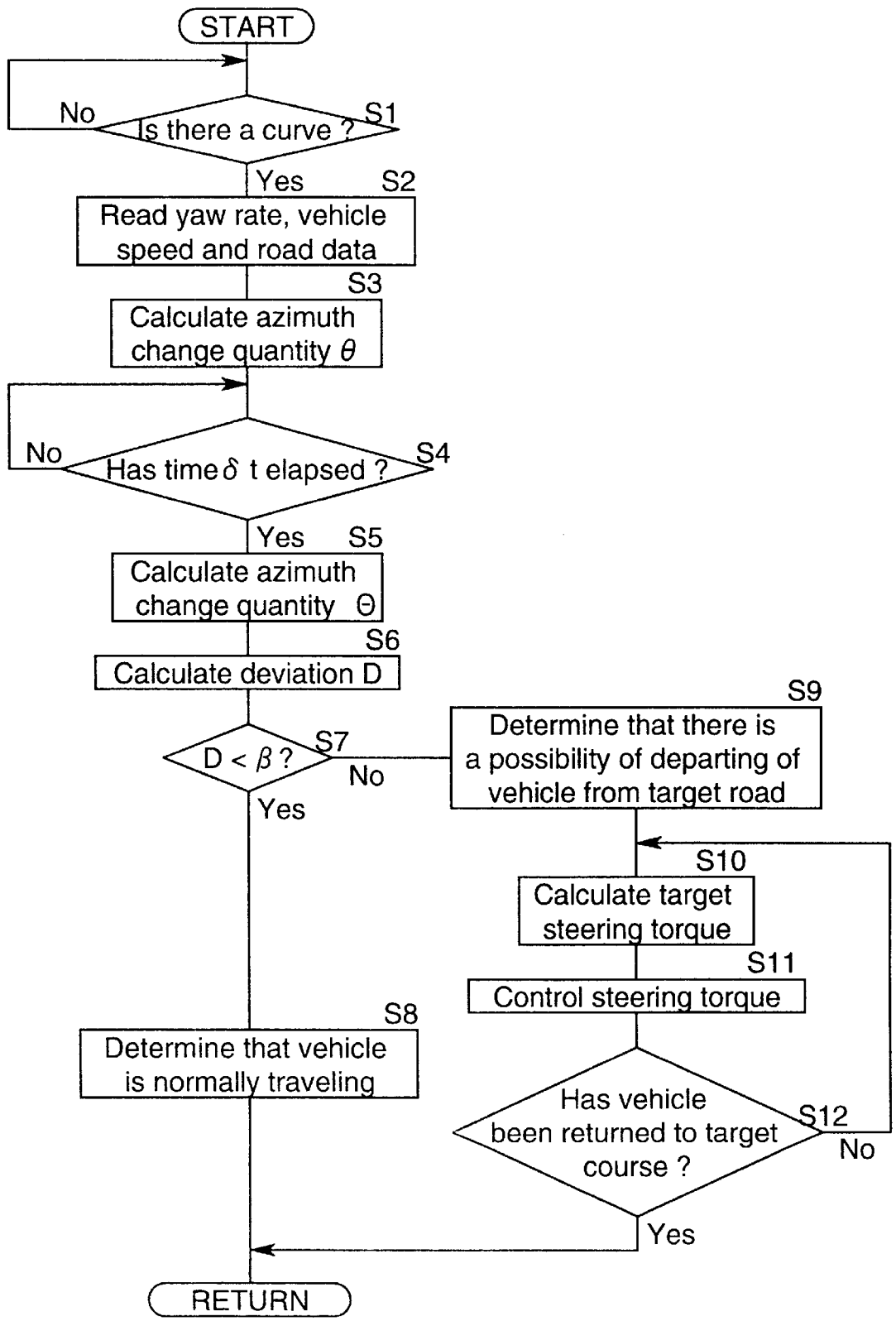
FIG. 2 is a flowchart for explaining the operation.
Figure 4:
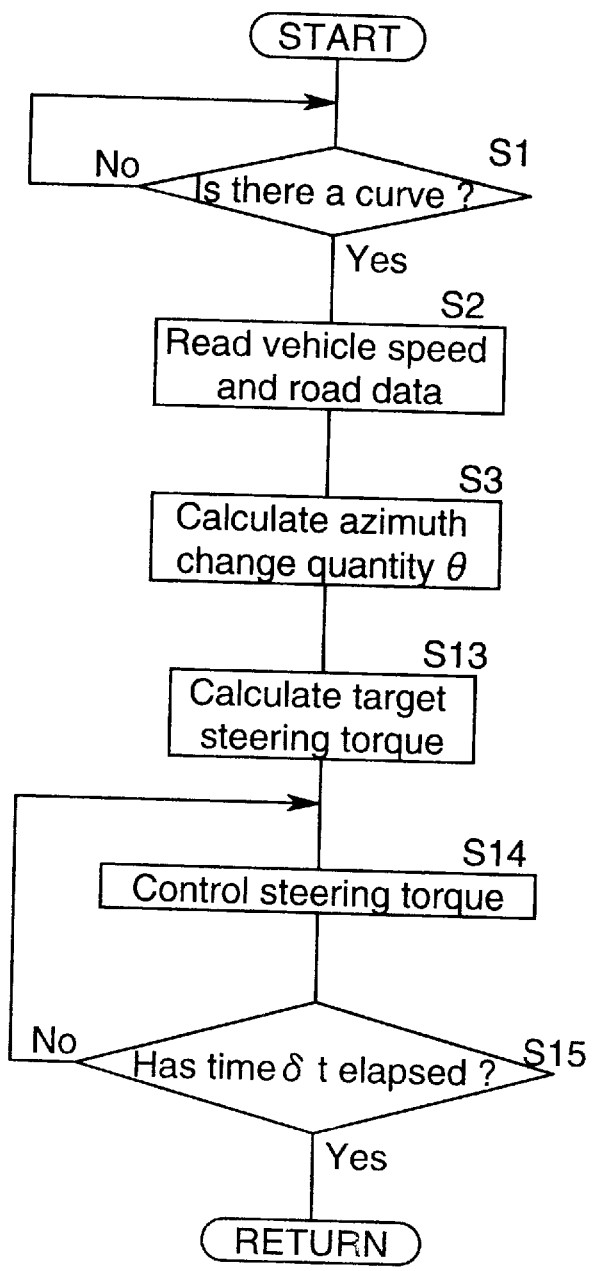
FIG. 4 is a flowchart according to a second embodiment of the present invention.

Steps S1 to S3 in the flowchart shown in FIG. 4 are substantially the same as steps S1 to S3 in the flowchart shown in FIG. 2. At steps S1 to S3, an azimuth change quantity $\theta$ of a road is calculated. However, at step S2 in the flowchart shown in FIG. 4, the reading of a yaw rate is not carried out.

Then, a target steering torque to be output by the steering torque applying means 14 is calculated based on a time-differentiation value of the azimuth change quantity $\theta$ in the control means 13 (at step S13), and the steering device 15 is driven based on the target steering torque (at step S14). When the vehicle has reached the third reference node $N_3$ from the second reference node $N_2$, the above-described operation is repeated based on new reference nodes $N_1$, $N_2$, $N_3$ and $N_4$ (at step S15).

In the second embodiment, the steering device 15 is feedforward-controlled so that the vehicle follows a previously detected azimuth change quantity $\theta$ of the road and hence, the vehicle can be reliably guided along the road to help the driver's driving operation.

Figure 5:
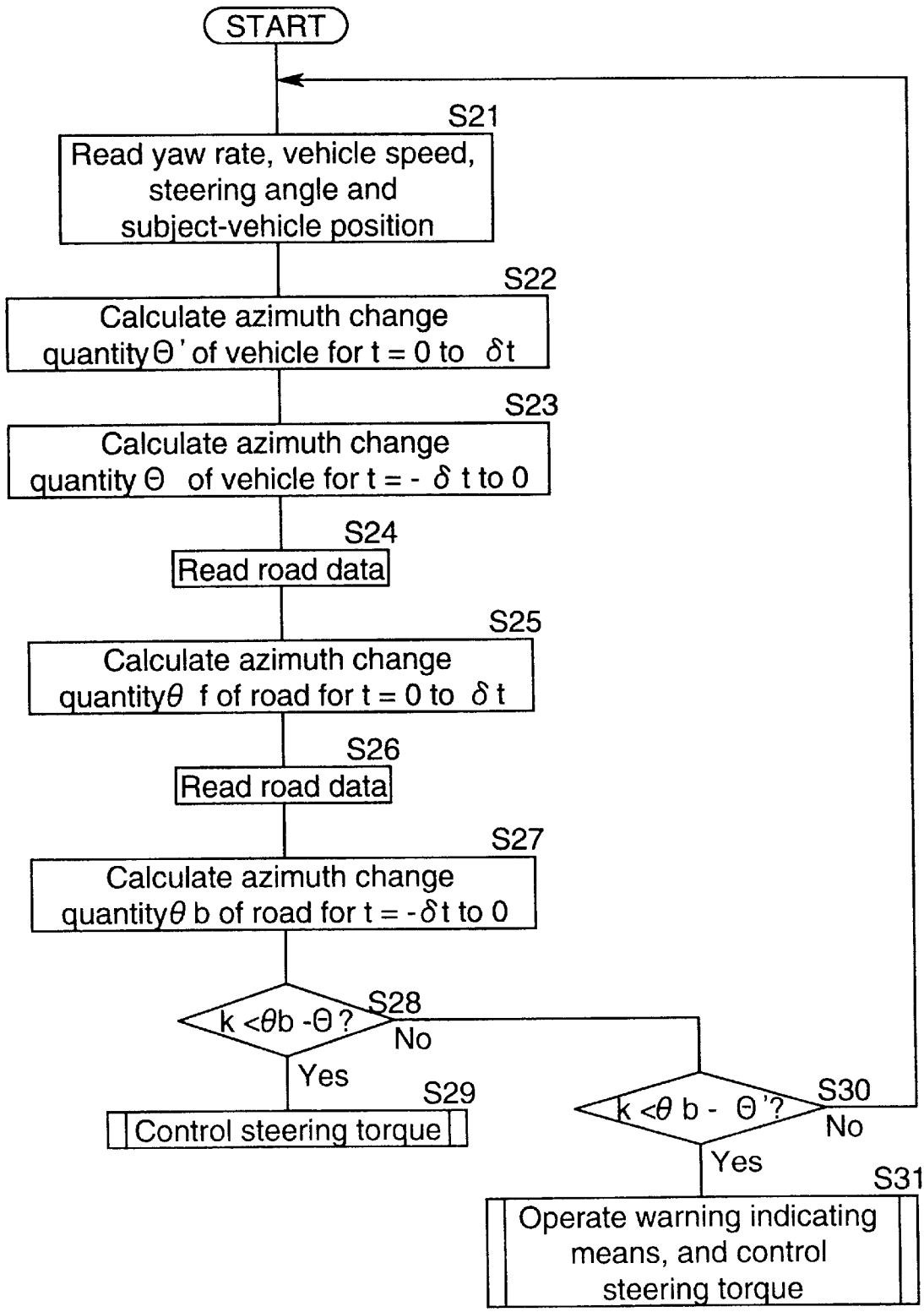
FIG. 5 is a flowchart according to a third embodiment of the present invention.

A third embodiment of the present invention will now be described with reference to a flowchart in FIG. 5. In the third embodiment, both of the feedback control and the feedforward control are used in combination.

First, a yaw rate $\gamma$ is read from the yaw rate sensor 1; a vehicle speed $V_0$ of the subject vehicle is read from the vehicle speed sensor 2; a steering angle $\theta_{STRG}$ is read from the steering angle sensor $S_1$ and further, a position $P_0$ of the subject vehicle is read (at step A21).

Then, an azimuth change quantity $\Theta'$ of the vehicle from $t=0$ to $t=\delta t$ is calculated based on the steering angle $\theta_{STRG}$ (at step S22). More specifically, a turning radius $R$ for the vehicle traveling at the steering angle $\theta_{STRG}$ and the vehicle speed $V_0$ is given according to the following equation:

$$R=(1+AV_0^2) \times L \times N/\theta_{STRG} \qquad (5)$$

wherein $A$ is a stability factor; $L$ is a wheel base; and $N$ is a steering gear ratio. Therefore, the azimuth change quantity $\Theta'$ of the vehicle from $t=0$ to $t=\delta t$ based on the steering angle $\theta_{STRG}$ is given according to the following equation:

$$\Theta'=V_0 \times \delta t/R = \theta_{STRG} \times V_0 \times \delta t/\{(1+AV_0^2) \times L \times N\} \qquad (6)$$

Then, an azimuth change quantity $\Theta$ of the vehicle from $t=\delta t$ to $t=0$ is calculated by integrating the yaw rate $\gamma$ from $t=-\delta t$ to $t=0$ (at step S23).

Subsequently, four nodes $N_1$, $N_2$, $N_3$ and $N_4$ extracted from the road data are extracted (at step S24), and an azimuth change quantity $\theta f$ of the road from $t=0$ to $t=\delta t$ is calculated based on the nodes $N_1$, $N_2$, $N_3$ and $N_4$ (at step S25). This azimuth change quantity $\theta f$ of the road is calculated in the same manner as is the azimuth change quantity $\theta$ of the road calculated at step S3 in the flowchart (see FIG. 2) in the first embodiment.

Then, other four nodes $N_1$, $N_2$, $N_3$ and $N_4$ at positions short of the above-described four node $N_1$, $N_2$, $N_3$ and $N_4$ by an increment of a distance $a$ are extracted (at step S26), and an azimuth change quantity $\theta b$ of the road from $t=-\delta t$ to $t=0$ is calculated based on these nodes $N_1$, $N_2$, $N_3$ and $N_4$ (at step S27). The azimuth change quantity $\theta b$ of the road is also calculated in the same manner as is the azimuth change quantity $\theta$ of the road calculated at step S3 in the flowchart (see FIG. 2) in the first embodiment.

A deviation between the azimuth change quantity $\theta b$ of the road from $t=-\delta t$ to $t=0$ determined at step S27 and the azimuth change quantity $\Theta$ of the vehicle from $t=-\delta t$ to $t=0$ determined at step S23 is compared with a predetermined reference value $k$ (at step S28). If the answer at step S28 is YES to indicate that the deviation exceeds the reference value $k$, the steering torque applying means 14 feedback-controls the steering device 15 with a predetermined steering torque in order to converge the deviation into zero to avoid the departing of the vehicle from the road (at step S29).

If the answer at step S28 is NO to indicate that the deviation is equal to or smaller than the reference value $k$, a deviation between the azimuth change quantity Θ' of the vehicle from t=0 to t=δt calculated at step S22 and the azimuth change quantity θf of the road from t=0 to t=δt calculated at step S25 is compared with a predetermined reference value m (at step S30). If the answer at step S30 is YES to indicate that the deviation exceeds the reference value m, the steering torque applying means 14 feedforward-controls the steering device 15 with a predetermined steering torque in order to previously prevent the generation of the deviation to avoid the departing of the vehicle from the road, and a warning is given to the driver by the warning indicating means 17 (at step S31).

By using the feedback control excellent in convergence and the feedforward control excellent in responsiveness in combination, as described above, the possibility of the departing of the vehicle from the road can be further reduced.

When the driver is unskilled in driving technique, or has a lowered driving capability, it is effective that the steering device 15 is controlled to avoid the departing of the vehicle from the road. However, when the driver has a normal driving level, the steering conducted by the driver himself while perceiving a curve may interfere with the steerage control in some cases. In such a case, the driver's intention is preferential, and the steerage control is discontinued. The details thereof will be described as a fourth embodiment with reference to a flowchart in FIG. 6.

First, if it is determined that there is a possibility that the vehicle will depart from the road (at step S41), the steerage control described in the first, second and third embodiments, when the vehicle speed $V_0$ exceed 30 km/hr (at step S42), is carried out to avoid the departing of the vehicle from the road (at step S43). When the vehicle speed $V_0$ is equal to or lower than 30 km/hr, i.e., during steerage at a large steering angle, the steerage control is not carried out.

When the steerage control has been carried out at step S43, the amount of change in accelerator opening degree exceeds a predetermined value (at step S44), the steerage control is stopped (at step S49).

Likewise, when the steerage control has been carried out at step S43, the steerage control is stopped, if the braking operation has been conducted (at step S45), if the rate of change in steering angle $\theta_{STRG}$ with time, i.e., the angular exceeds a predetermined value (at step S46), the steerage control is stopped at step S49, if the steering torque provided by the driver's spontaneous steerage exceeds a predetermined value (at step S47) and if the winker operation has been conducted (at step S48).

In this way, when the driver is in a normal condition and is conducting any driving operation with his own intention, the steering operation conducted by the driver himself is in preference to the steerage control, thereby avoiding the interference of the driver's steering operation and the steerage control with each other.

The conceivable purposes of the steerage control described in the first to fourth embodiments are not only to merely avoid the departing of the vehicle from the road, but also to enhance the steerage feeling and the travel stability by conducting the steerage suitable for a road district such as a highway, a winding road, an urban area and the like.

A fifth embodiment achieves such purposes. In the fifth embodiment, the value of a steering torque applied to the steering means 15 by the steering torque applying means 14 is regulated by the regulating means 16 (see FIG. 1) to which a road district is input from the course searching means 10.

Figure 7A:
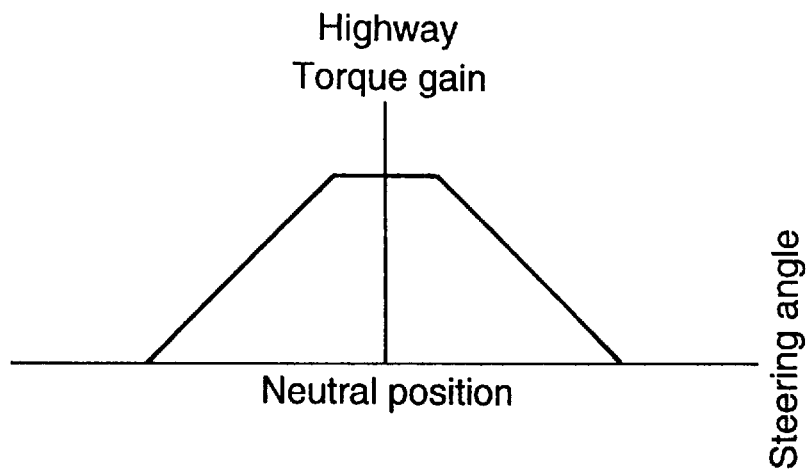
FIG. 7 is a diagram for explaining a fifth embodiment.
Figure 7B:
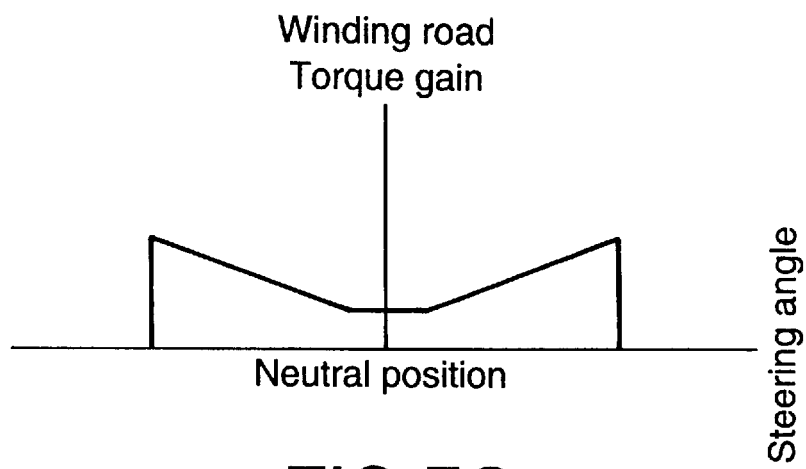
Figure 7C:
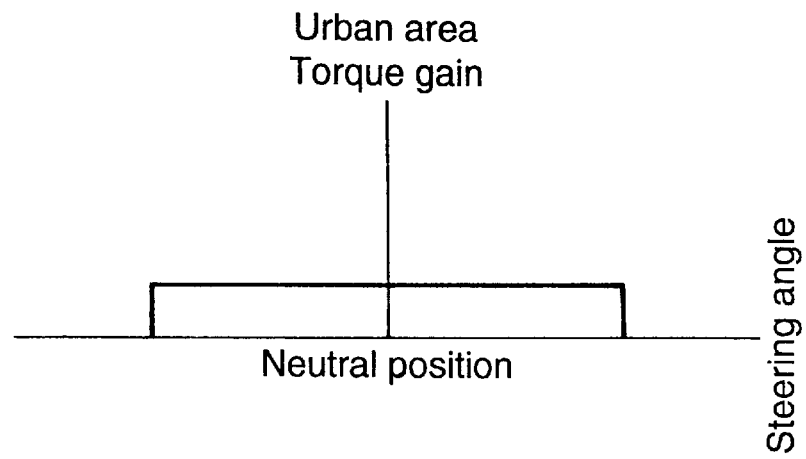
Figure 8:
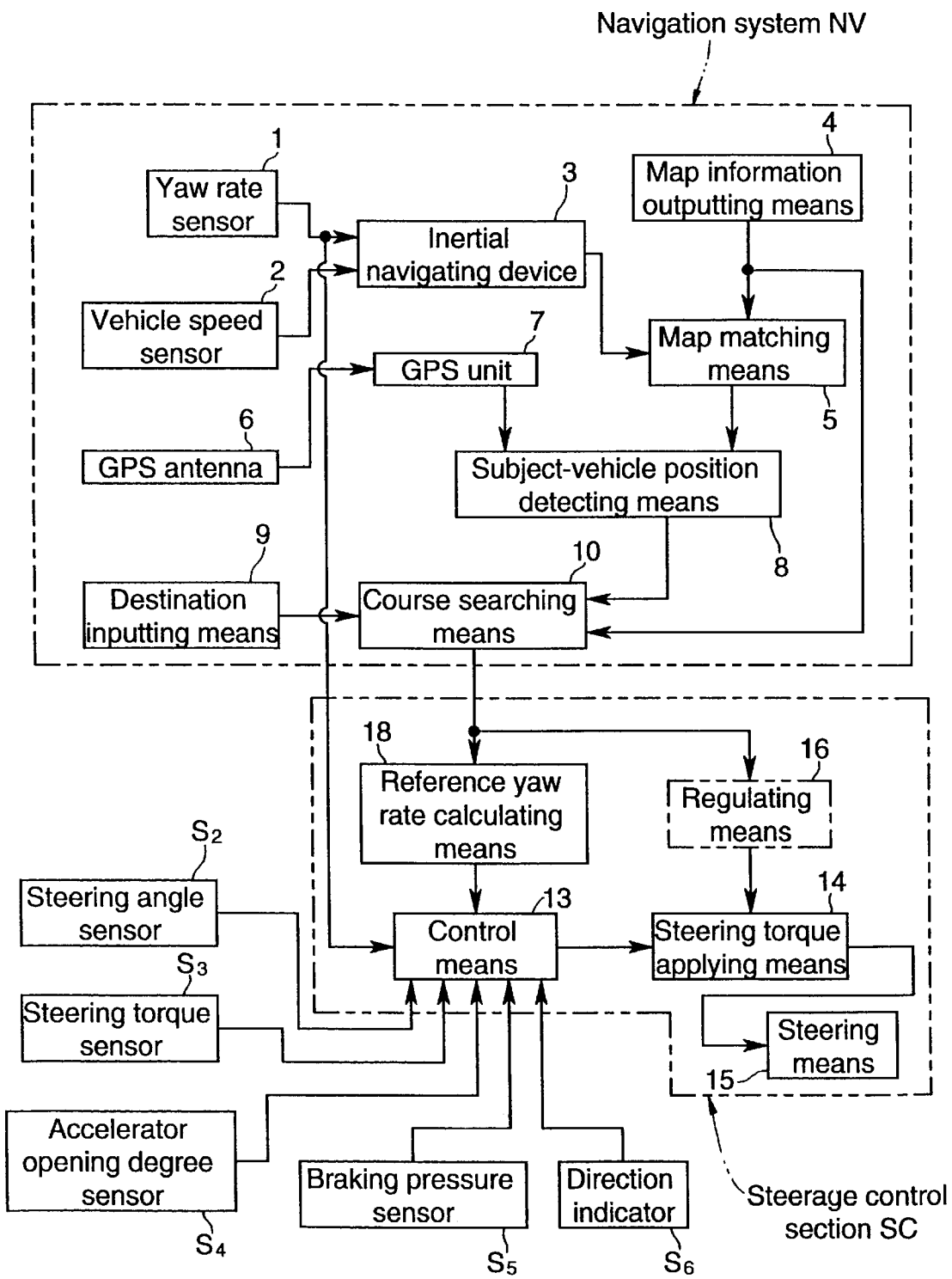
FIG. 8 is a block diagram showing the entire arrangement of a vehicle control system according to a sixth embodiment of the present invention.

For example, if the road district is a highway, the straight advancing property against an external disturbance such as a side wind, a wheel track and the like can be enhanced by setting the gain of the steering torque determined by the steering torque applying means 14 in a higher range in the vicinity of the neutral, as shown in FIG. 7A. If the road district is a winding road, the interference with the driver's spontaneous steering operation can be avoided to enhance the maneuverability by setting the gain of the steering torque determined by the steering torque applying means 14 in a lower range in the vicinity of the neutral, as shown in FIG. 7B. Further, if the road district is an urban area, the moderate compatibility of the straight advancing property and the maneuverability can be provided by setting the gain of the steering torque at a given value, as shown in FIG. 7C.

Even in the above-described first and second embodiments, if there is a possibility that the vehicle will depart from the road, the warning indicating means 17 can be operated.

A sixth embodiment of the present invention will now be described with reference to FIGS. 8 to 12. As can be seen from FIG. 8, a steerage control section SC in the sixth embodiment includes a reference yaw rate determining means 18 for determining a yaw rate presumed to be generated when the subject vehicle will travel on a road ahead of the subject vehicle, as a reference yaw rate $\gamma_{REF}$ based on the shape of the road searched by the course searching means 10, a control means 13 which compares an actual yaw rate γ detected by the yaw rate sensor 1 with the reference yaw rate $\gamma_{REF}$ and calculates a steerage assisting torque T in accordance with a deviation between the yaw rates $\gamma_{REF}$ and γ, a steering torque applying means 14 for applying the steerage assisting torque T to a steering means 15 for steering the steering control wheel based on a signal from the control means 13, and a regulating means 16 for regulating the motion of the steering torque applying means 14 based on a signal from the course searching means 10. Here, the steering torque applying means 14 is, for example, an actuator for an electric power-steering device, or the like.

A steering angle sensor $S_2$, a steering torque sensor $S_3$, an accelerator opening degree $S_4$, a braking pressure sensor $S_5$ and a direction indicator $S_6$ are connected to the control means 13 in order to discontinue the steerage control when a predetermined condition has been realized.

The operation of the sixth embodiment of the present invention will be described below with reference to a flowchart in FIG. 9.

First, the position of the subject vehicle on a map and data for a road ahead of the subject vehicle position are read by the navigation system NV (steps S1 and S2).

An azimuth change quantity θ of the road (i.e., an azimuth change quantity θ between a second node $N_2$ and a third node $N_3$ is calculated based on FIG. 3 and according to the above-described equation (3) (at step SS3) . A reference yaw rate $\gamma_{REF}$ is calculated by dividing such azimuth change quantity θ by a time δt required for the vehicle to travel from the second reference node $N_2$ to the third reference node $N_3$ (at step S4)

$$\gamma_{REF}=\theta/\delta t \qquad (7)$$

Figure 10:
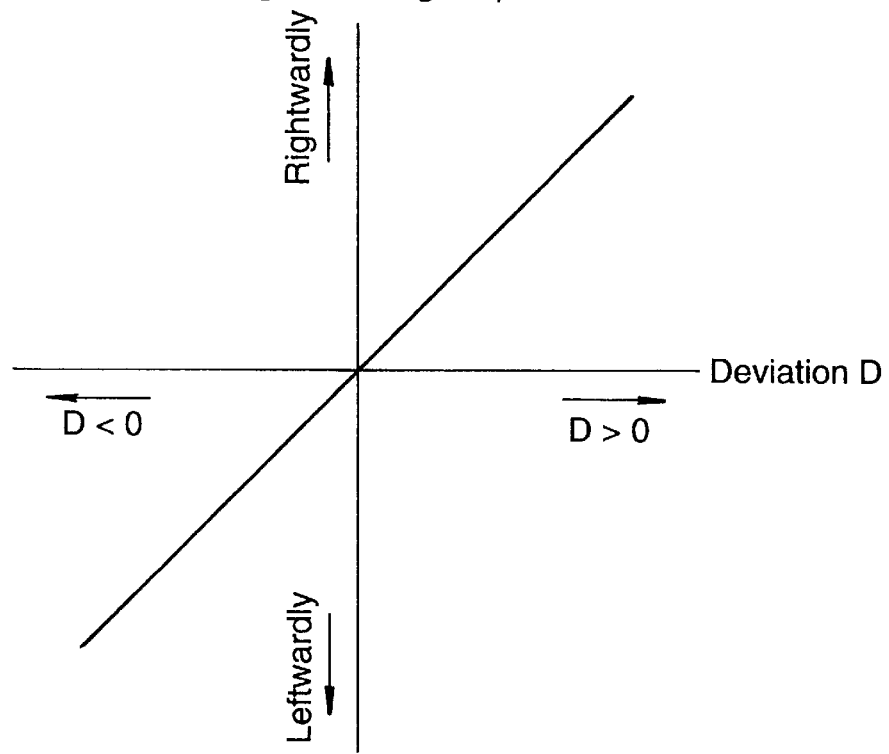
FIG. 10 is a graph illustrating the relationship between the deviation and the steerage assisting torque T.

Then, an actual yaw rate γ is read from the yaw rate sensor 1 (at step S5), and a deviation D between the reference yaw rate $\gamma_{REF}$ calculated at step S4 and the actual yaw rate γ determined at step S5 is calculated (at step S6). A steerage assisting torque T (T=kD) proportional to the deviation D is determined (at step S7). For example, when the deviation D is positive as shown in FIG. 10, a steerage assisting torque T permitting the steering control wheel to be steered rightwardly is provided to the steering means 15. When the deviation D is negative, a steerage assisting torque T permitting the steering control wheel to be steered leftwardly is provided to the steering means 15.

Figure 11:
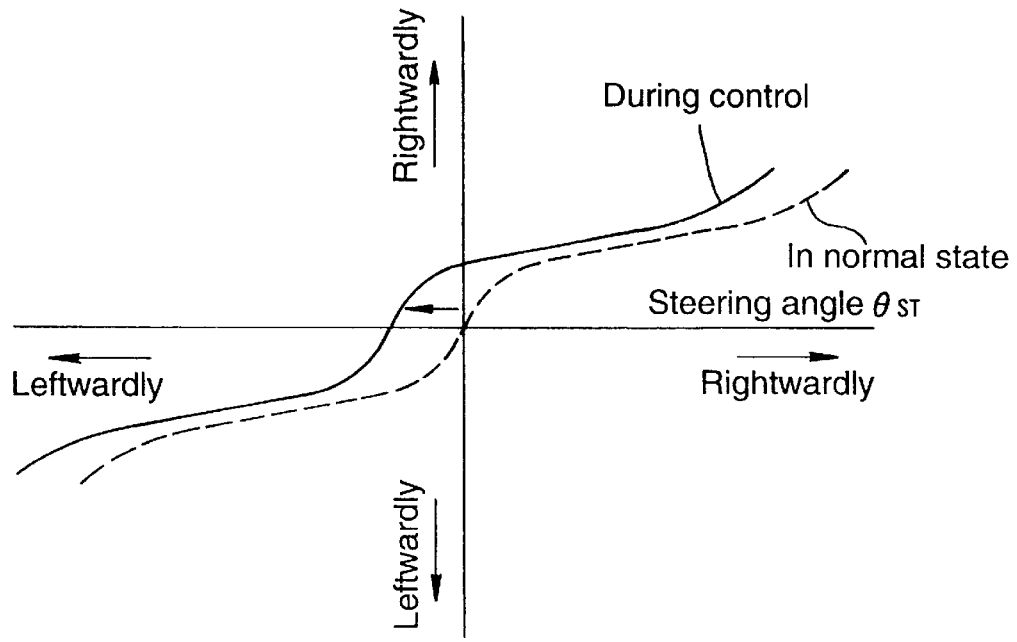
FIG. 11 is a graph illustrating the relationship between the steering angle $\theta_{ST}$ and the steerage assisting torque T.
Figure 12:
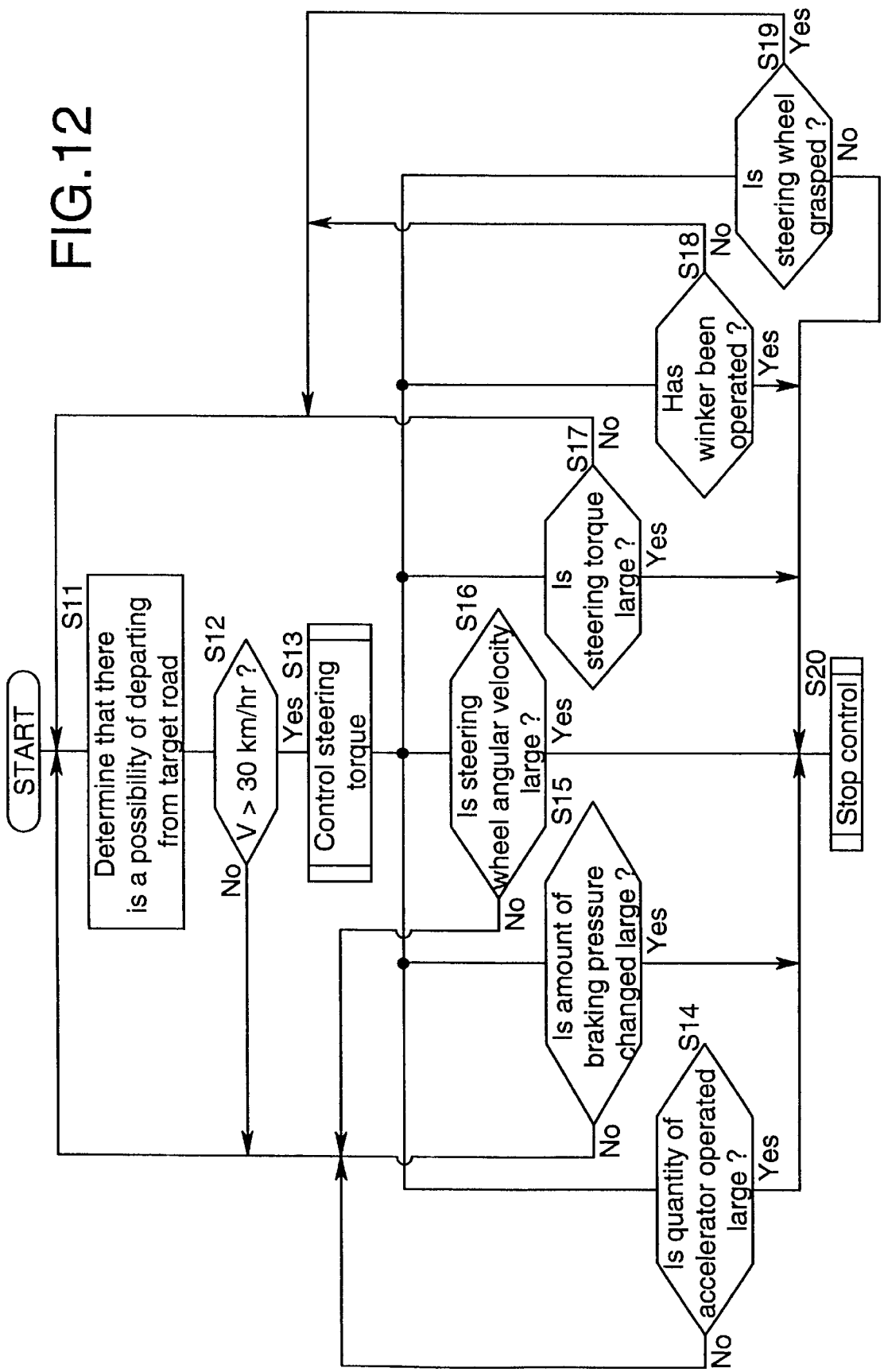
FIG. 12 is a flowchart of a steerage control discontinuing routine.

A dashed line in FIG. 11 indicates a steering characteristic in a normal condition. A steerage assisting torque T according to a steering angle $\theta_{ST}$ of a steering control wheel is generated, but when there is a possibility that the vehicle will depart leftwardly from a course, the steering characteristic is controlled from a condition shown by dashed line to a condition shown in a solid line. As a result, a predetermined steerage assiting torque T permitting the steering control wheel to be steered rightwardly is generated, even if the steering control wheel is not steered (i.e., even if the steering angle $\theta_{ST}=0$). Thus, the vehicle is assisted to return to a correct course.

By conducting such feedback control, even if the driver is unskilled in driving technique or has a lowered driving capability due to fatigue, it is facilitated for the locus of traveling of the vehicle to follow the shape of the road, whereby the possibility of the departing of the vehicle from the road can be remarkably reduced.

When the driver is unskilled in driving technique or has a lowered driving capability due to fatigue, it is effective that the steering means 15 is controlled to avoid the departing of the vehicle from the road, as described above. However, when the driver is at a normal level, the steering operation conducted by the driver himself while perceiving a curve may interfere with the steerage control in some cases. In such a case, the driver's intention is preferential, and the steerage control is discontinued. The details thereof will be described below with reference to a flowchart in FIG. 12.

First, when a deviation is generated between the reference yaw rate $\gamma_{REF}$ and the actual yaw rate $\gamma$ and it is determined that there is a possibility that the vehicle will depart from the road (at step S11), the steerage control, when the vehicle speed V exceeds 30 km/hr (at step S12), is carried out to avoid the departing of the vehicle from the road (at step S13). When the vehicle speed V is equal to or lower than 30 km/hr (at step S12), i.e., during traveling of the vehicle at a lower speed attendant with a possibility that the steering operation at a larger steering angle b is conducted, the steerage control is not carried out.

Now, when the steerage control has been conducted at step S13, the steerage control is stopped (at step S19), if the amount of variation in accelerator opening degree detected by the accelerator opening degree sensor $S_4$ exceeds a predetermined value (at step S14).

Likewise, when the steerage control has been carried out at step S13, the steerage control is stopped, if the amount of change in braking pressure detected by the braking pressure sensor $S_5$ exceeds a predetermined value (at step S15), if the rate of change in steering angle $\theta_{ST}$ detected by the steering angle sensor $S_2$ with time, i.e., the steering angular velocity exceeds a predetermined value (at step S16), if the steering torque provided by the driver's spontaneous steering operation and detected by the steering torque sensor $S_3$ (at step S17), if the operation of the direction indicator $S_6$ is conducted (st step S18), and if the steering torque detected by the steering torque sensor $S_3$ is approximately zero and the driver does not grasp the steering wheel (at step S19).

In this way, when the driver is in a normal condition and is conducting any driving operation with his own intention, the steering operation conducted by the driver himself is preferential to the steerage control, thereby avoiding the interference of the driver's steering operation and the steerage control with each other. If a steerage assisting torque T is applied when the driver has released his hand from the steering wheel due to dozing, a problem of cutting of the steering in such a direction is encountered. However, the application of an unnecessary steerage assisting torque is avoided by discontinuing the steerage control by step S19.

The conceivable purposes of conducting the steerage are not only to merely avoid the departing of the vehicle from the road, but also to enhance the steerage feeling and the travel stability by conducting the steerage suitable for a road district such as a highway, a winding road, an urban area and the like.

To achieve such purpose, the value of a steering torque applied to the steering means 15 by the steering torque applying means 14 is regulated, as described with reference to FIG. 7, by the regulating means 16 (see FIG. 8) to which a road district is input from the course searching means 10.

A seventh embodiment of the present invention will now be described.

Figure 13:
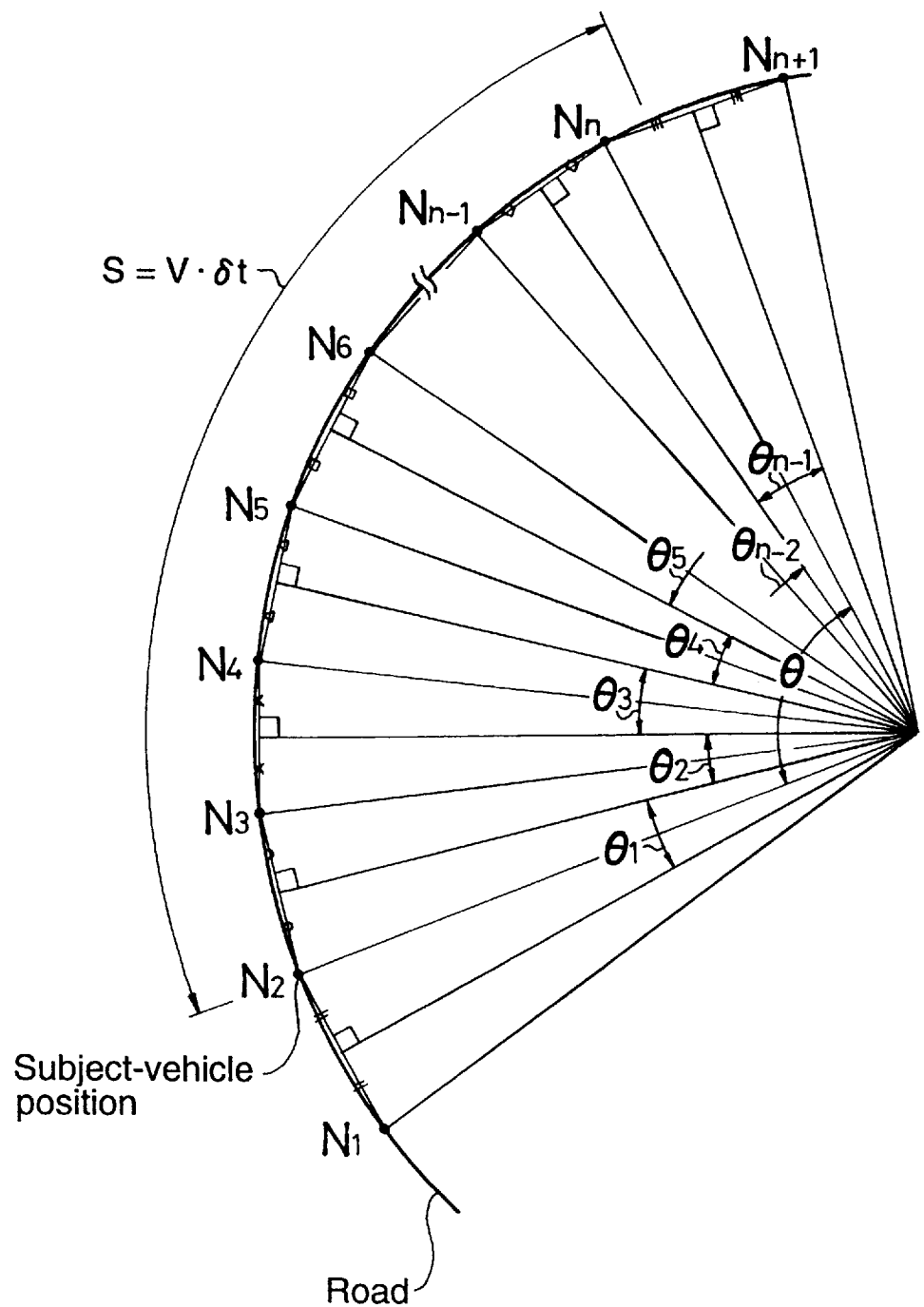
FIG. 13 is a diagram for explaining another method for determining an azimuth change quantity of a road according to a seventh embodiment of the present invention.
Figure 14:
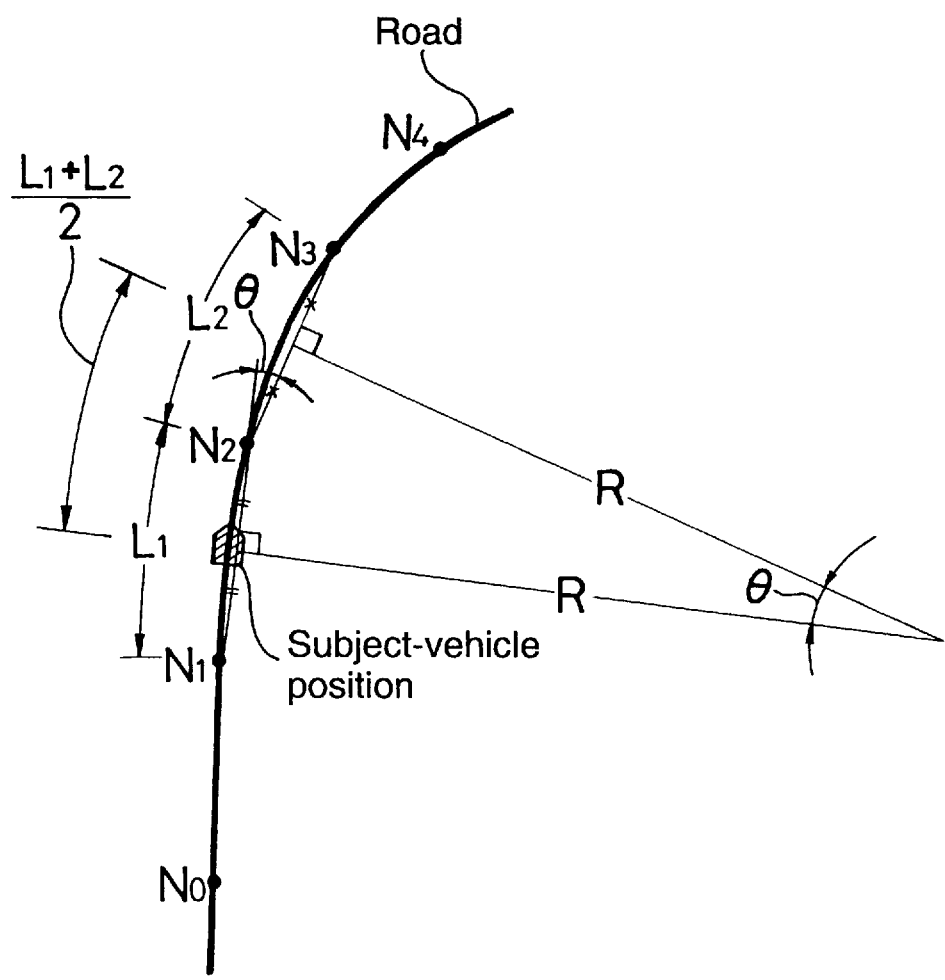
FIG. 14 is a diagram for explaining a further method for determining an azimuth change quantity of a road according to a eighth embodiment of the present invention.

In the previous sixth embodiment, the azimuth change quantity $\theta$ between the second reference node $N_2$ which is the position of the subject vehicle and the third reference node $N_3$ ahead of the position of the subject vehicle is calculated. However, when a map data with a very large number of data quantity and a high node density is used, the azimuth change quantity $\theta$ to three pr more nodes (i.e., from the second node $N_2$ to a n-th node $N_n$) can be calculated by a technique shown in FIG. 13.

If the nodes existing within a distance S determined by multiplying a predetermined time $\delta t$ and a vehicle speed by each other are represented by $N_2, N_3, --- N_n$. In this case, the node $N_1$ is a node short of the position of the subject vehicle, and the node $N_2$ is a node which is at the position of the subject vehicle. As can be seen from FIG. 13, the azimuth change quantity $\theta$ from the node $N_2$ to the node $N_n$ is provided according to the following equation:

$$\theta=(\theta_1/2)+\theta_2+\theta_3+---\theta_{n-2}+(\theta_{n-1}/2) \qquad (8)$$

$\theta_1$ to $\theta_{n-1}$ can be calculated in the same manner as the equations (1) and (2), and the equation (3) corresponds to the equation (8) in which n is 3.

The reference yaw rate $\gamma_{REF}$ is calculated by dividing the azimuth change quantity $\theta$ calculated according to the equation (8) by the time $\delta t$.

When a map data with a low node density is used, the azimuth change quantity $\theta$ can be calculated using three nodes $N_1$, $N_2$ and $N_3$.

When the position of the subject vehicle lies at the middle point between the nodes $N_1$ and $N_2$, the azimuth change quantity $\theta$ from the position of the subject vehicle to the middle point between the nodes $N_1$ and $N_2$ is equal to an angle $\theta$ formed by vectors $V_{12}$ and $V_{23}$, the $\theta$ being provided according to the equation (7). If the distance between the nodes $N_1$ and $N_2$ is represented by $L_1$ and the distance between the nodes $N_2$ and $N_3$ is represented by $L_2$, the time $\delta t$ required for the vehicle to travel over a distance $(L_1+L_2)/2$ from the middle point between the nodes $N_1$ and $N_2$ to the middle point between the nodes $N_2$ and $N_3$ is equal to $(L_1+L_2)/2V$. Therefore, the reference yaw rate $\gamma_{REF}$ is provided according to the following equation:

$$\gamma_{REF}=2\theta V/(L_1+L_2) \qquad (9)$$

Figure 15:
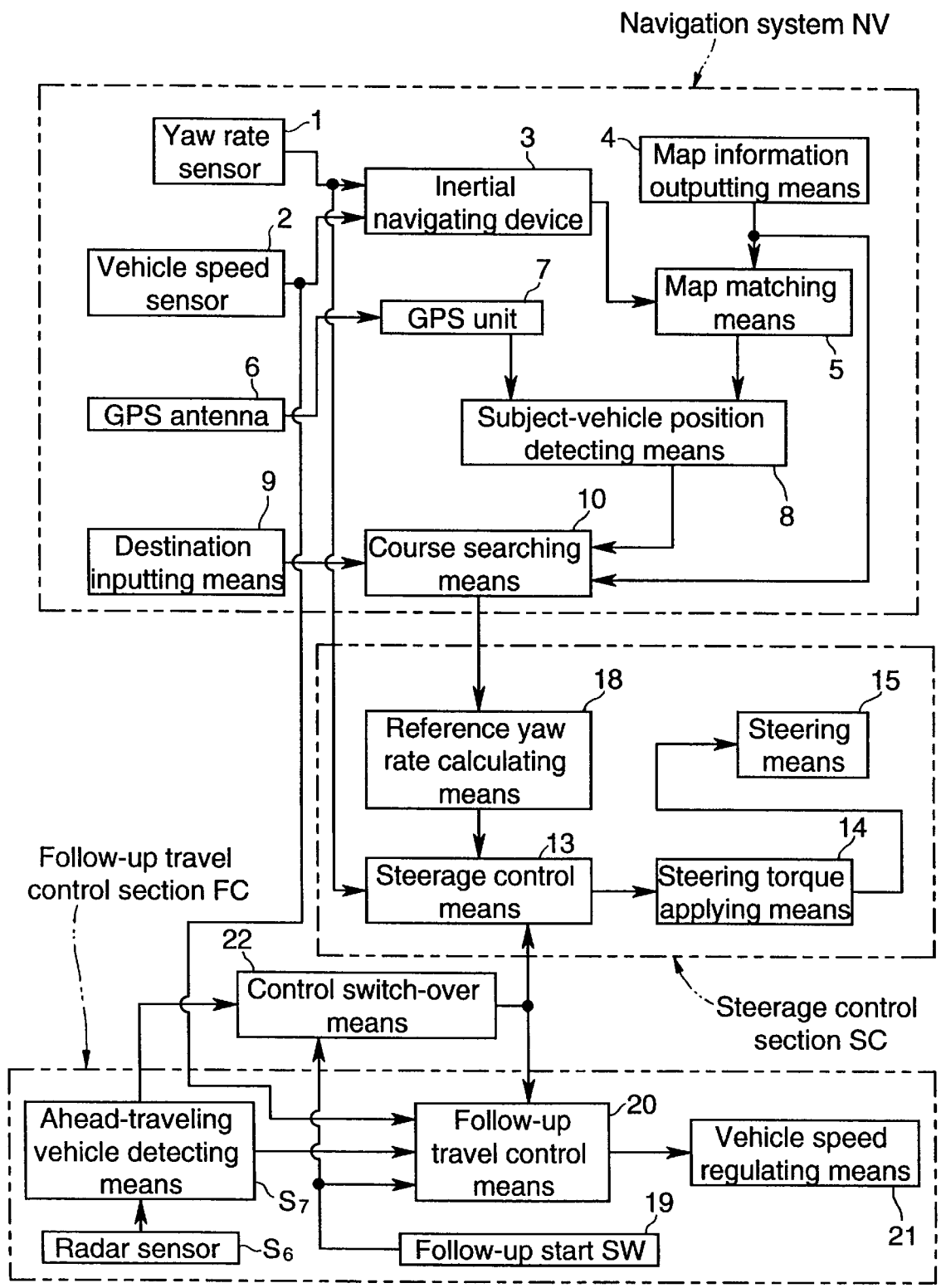
FIG. 15 is a block diagram showing the entire arrangement of a vehicle control system according to a ninth embodiment of the present invention.

A ninth embodiment of the present invention will now described with reference to FIGS. 15 to 17. In FIG. 15, the arrangement of a navigation system NV and the structure of a steerage control section SC are substantially the same as those in the sixth embodiment shown in FIG. 8. The steerage control section SC in the ninth embodiment does not includes the regulating means 16 described with reference to FIG. 8, but of course, the regulating means 16 can be added.

Reference character FC is a follow-up travel control section which includes a radar sensor $S_6$, an ahead-traveling vehicle detecting means $S_7$ for detecting whether there is a vehicle traveling ahead of the subject vehicle (which will be referred to as an ahead-traveling vehicle hereinafter), a distance between the subject vehicle and the ahead-traveling vehicle, a relative speed between the subject vehicle and the ahead-traveling vehicle and the like, based on a signal from the radar sensor $S_6$, and a follow-up travel control means 20 for allowing the subject vehicle to travel while following the ahead-traveling vehicle, based on signals from the ahead-traveling vehicle detecting means $S_7$, the vehicle speed sensor 2 and the follow-up starting switch 19. A vehicle speed regulating means 21 regulates the vehicle speed, based on a signal from the follow-up travel control means 20, thereby maintaining the distance between the subject vehicle and the ahead-traveling vehicle constant. The vehicle speed regulating means 21 is, for example, a well-known automatic cruising device.

The signals from the ahead-traveling vehicle detecting means $S_7$ and the follow-up starting switch 19 are input into a control switching means 22 which is connected the control means of the steerage control section SC and the follow-up travel control means 20 of the follow-up travel control section FC.

The function of the follow-up travel control section FC will be described below with reference to a flowchart in FIG. 16.

First, when the follow-up starting switch 19 of the follow-up travel control section FC is depressed (at step S11), the ahead-traveling vehicle detecting means $S_7$ determines a distance and a relative speed of the subject vehicle relative to the ahead-traveling vehicle and, based on the signal from the radar sensor $S_2$, and the follow-up travel control means 20 controls the vehicle speed regulating means 21 to maintain a predetermined vehicle-vehicle distance suitable for the relative speed, thereby starting the control of the follow-up travel with respect to the ahead-traveling vehicle (at step S12). At this time, if the steerage control by the steerage control section SC is being carried out (at step S13), the steerage control by the steerage control section SC is discontinued in order to avoid the interference of both the follow-up travel control and the steerage control with each other (at step S14).

When the ahead-traveling vehicle has suddenly changed course to leave a range available for the radar sensor $S_6$ and the ahead-traveling vehicle detecting means $S_7$ has lost sight of the ahead-traveling vehicle (at step S15), the follow-up travel control by the follow-up travel control section FC is discontinued (at step S16). At this time, when the current condition is such that the steerage control has been in progress at step S13 and the steerage control has been discontinued at step S14 (at step S17), the steerage control is restarted (at step S18). Thus, if the follow-up travel control becomes impossible, the follow-up travel control can be restored quickly to the steerage control without conducting a special operation.

On the other hand, when the steerage control has not been discontinued at step S17, i.e., when the steerage control has not been originally carried out, if the ahead-traveling vehicle once lost sight of or a new ahead-traveling vehicle is found (at step S19), the control of the follow-up travel with respect to the found ahead-traveling vehicle is restarted.

A tenth embodiment of the present invention will now be described with reference to FIGS. 18 to 24.

Figure 18:
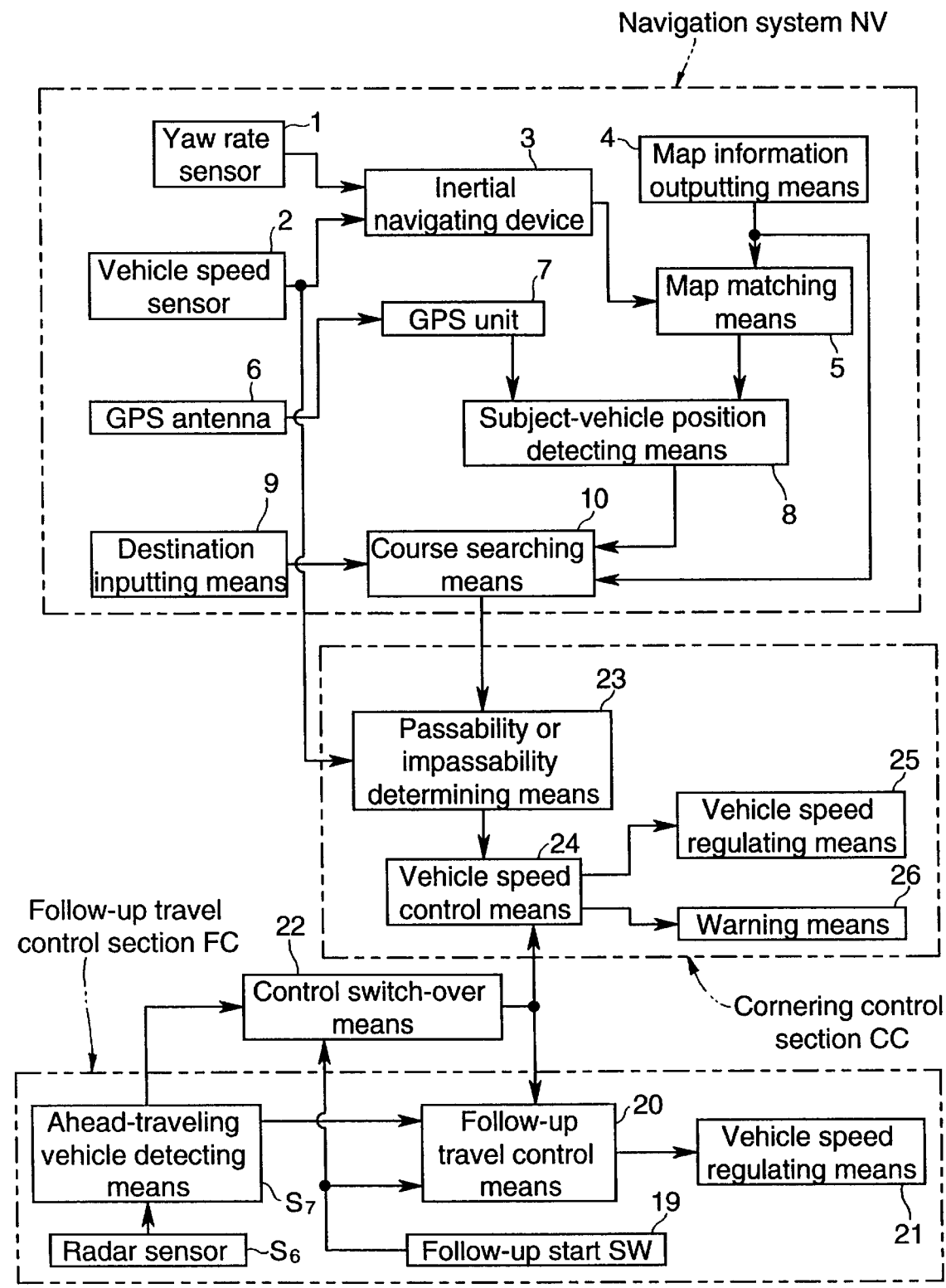
FIG. 18 is a block diagram showing the entire arrangement of a vehicle control system according to a tenth embodiment of the present invention.

As shown in FIG. 18, the arrangement of a navigation system NV and the structure of a follow-up travel control section FC are the same as in the ninth embodiment, but the tenth embodiment is different from the ninth embodiment in that a cornering control section CC is included in place of the steerage control section SC used in the ninth embodiment.

The cornering control section CC includes a passability/impassability determining means 23 for determining the subject vehicle can pass through a curve existing ahead of the subject vehicle at a current vehicle speed $V_0$, based on the shape of the road searched by the course searching means and based on the vehicle speed $V_0$ of the subject vehicle, and a control means 24 which varies the engine output or the braking force so as to enable the subject vehicle to pass through the curve, based on the determination by the passability/impassability determining means 23, thereby operating a vehicle speed regulating means 25 for regulating the vehicle speed and/or a warning means for giving a warning for pressing the driver for a speed reduction.

Figure 19:
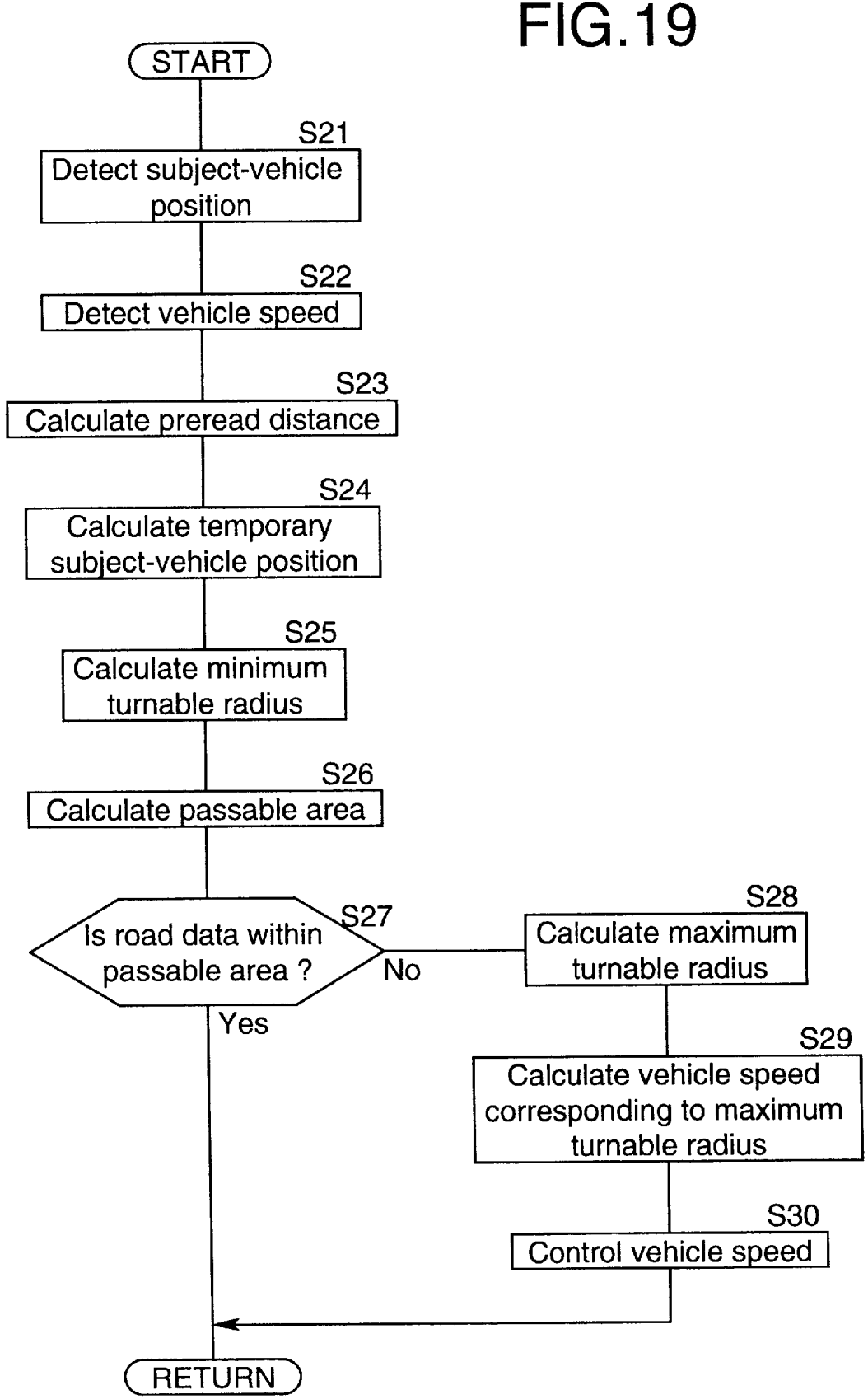
FIG. 19 a flowchart of a vehicle speed control routine.

The function of the cornering control section CC will be described below with reference to a flowchart in FIG. 19.

Figure 20:
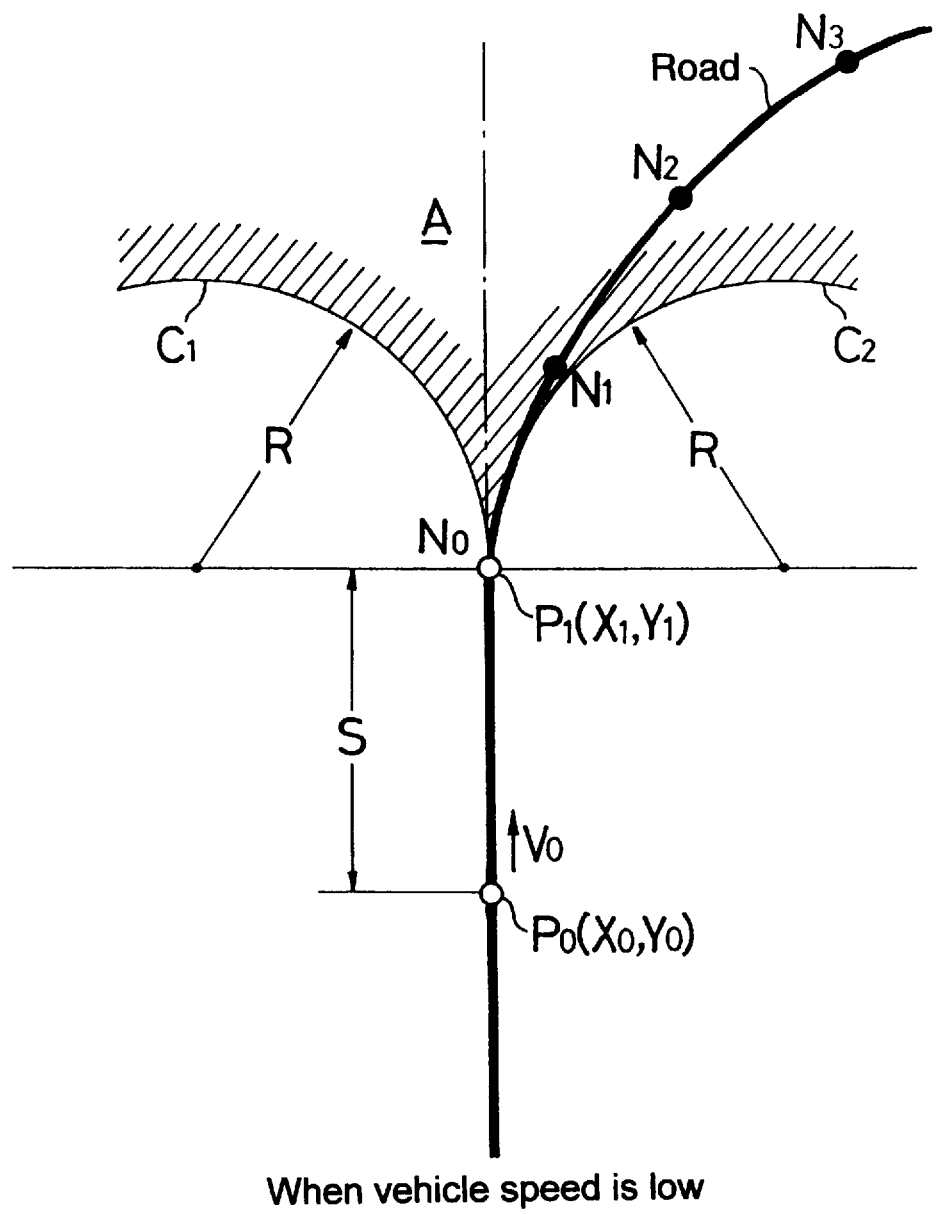
FIG. 20 is a diagram for explaining the operation during traveling of a vehicle at a low vehicle speed.
Figure 21:
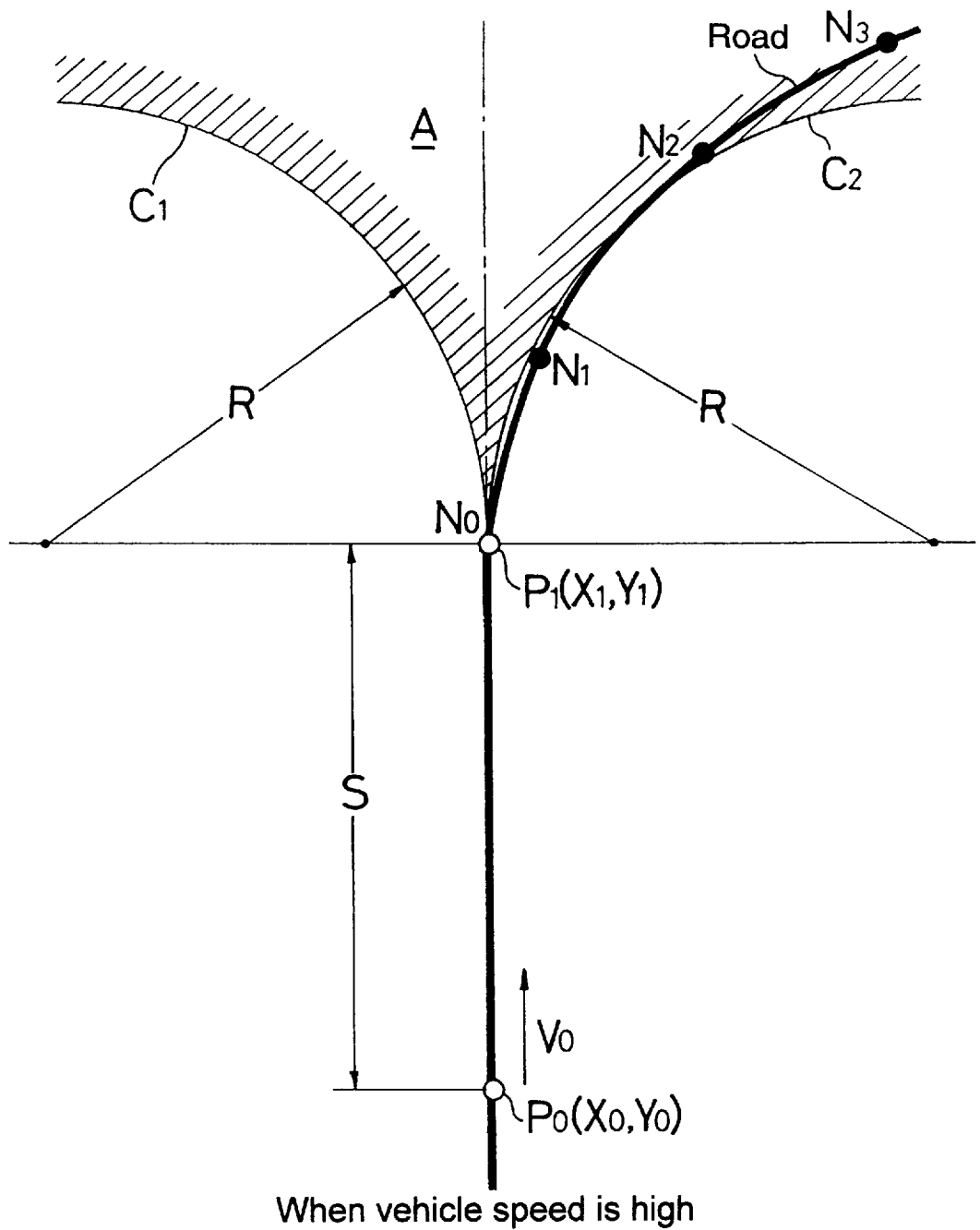
FIG. 21 is a diagram for explaining the operation during traveling of the vehicle at a high vehicle speed.

First, a current position $P_0$ ($X_0$, $Y_0$) and a vehicle speed $V_0$ of the subject vehicle (at steps S21 and S22). Then, a preread distance S is calculated based on the vehicle speed $V_0$ (at step S23). A temporary position $P_1$ ($X_1$, $Y_1$) of the subject vehicle is calculated from the position $P_0$ ($X_0$, $Y_0$) of the subject vehicle and the preread distance S (at step S24). As shown in FIGS. 20 and 21, the temporary position $P_1$ ($X_1$, $Y_1$) of the subject vehicle is a reference position suitable to determine whether the subject vehicle can pass through the curve and to set a passable vehicle speed $V_{MAX}$ at which the subject vehicle can pass through the curve, and the larger the vehicle speed $V_0$, the preread distance S is set longer, so that a sufficient speed-reducing distance can be insured when the current vehicle speed $V_0$ is too large and the subject vehicle cannot pass through a curve located ahead of the temporary position $P_1$ ($X_1$, $Y_1$) of the subject vehicle.

Next, the minimum turnable radius R is map-searched based on the vehicle speed $V_0$ (at step 25). The minimum turnable radius R is large when the $V_0$ is high, and is small when the vehicle speed $V_0$ is low.

Figure 26:
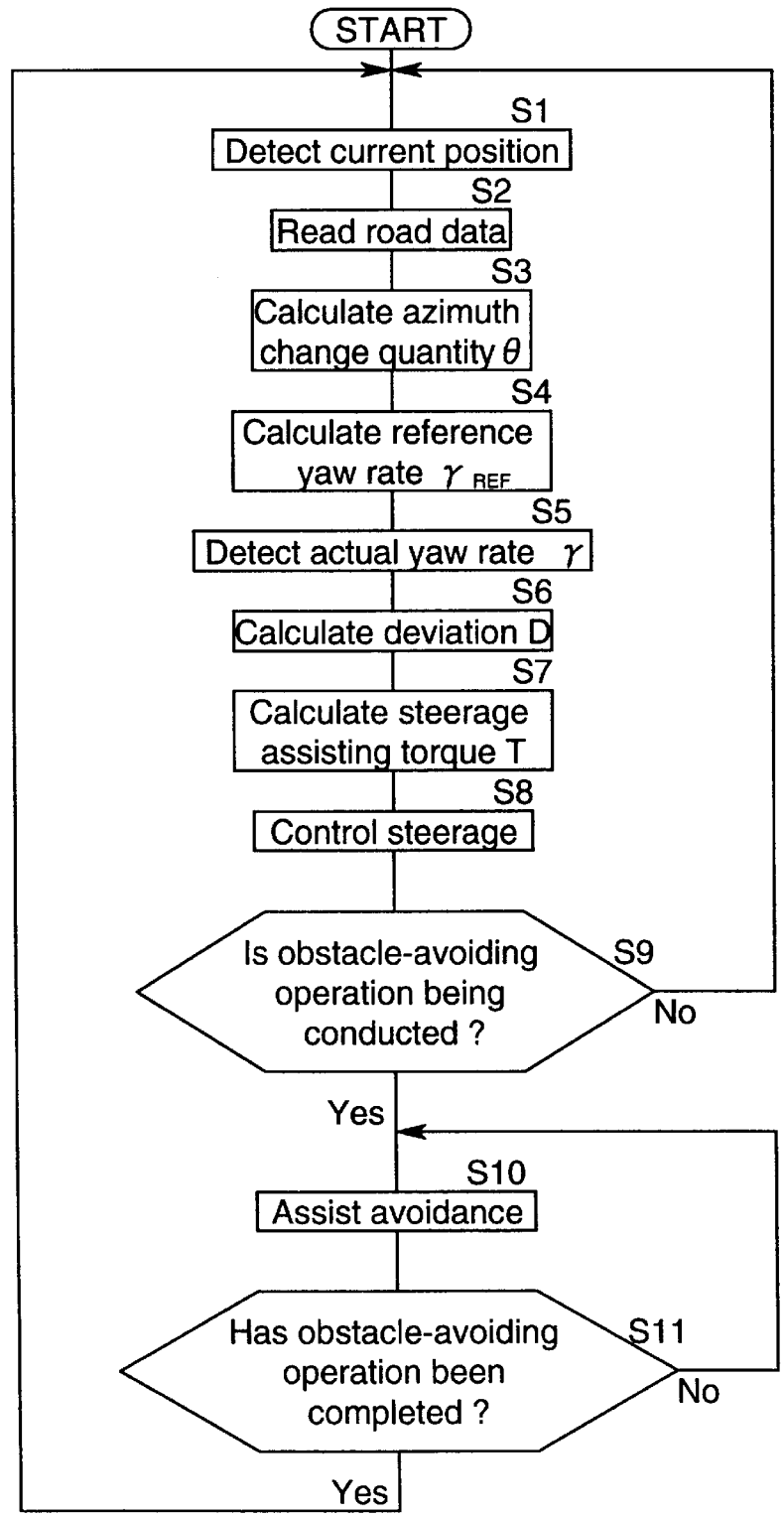
FIG. 26 is a flowchart for explaining the operation.

Then, a passable area A is calculated. More specifically, two circular arcs $C_1$ and $C_2$ having the same radius which is the minimum turnable radius R are described in the temporary position $P_1$ ($X_1$, $Y_1$) of the subject vehicle in such a manner that they are tangent to each other, and a passable area A is established outside the two circular arcs $C_1$ and $C_2$ (at step S26). As shown in FIG. 26, when the vehicle speed $V_0$ is smaller, the minimum turnable radius R of the vehicle is smaller and hence, the passable area A is wider. Reversely, as shown in FIG. 21, when the vehicle speed $V_0$ is larger, the minimum turnable radius R of the vehicle is larger and hence, the passable area A is narrower.

Then, it is determined whether a plurality of nodes N (=$N_1$, $N_2$, $N_3$ - - - ) established on a road exist within the passable area A (at step S27). When the node N exist within the passable area A, as shown in FIG. 20, it is determined that the vehicle can pass through the curve at the current vehicle speed $V_0$ as it is. Reversely, when the nodes N exist outside the passable area A, as shown in FIG. 21, it is determined that the vehicle cannot pass through the curve at the current vehicle speed $V_0$ as it is.

Figure 22:
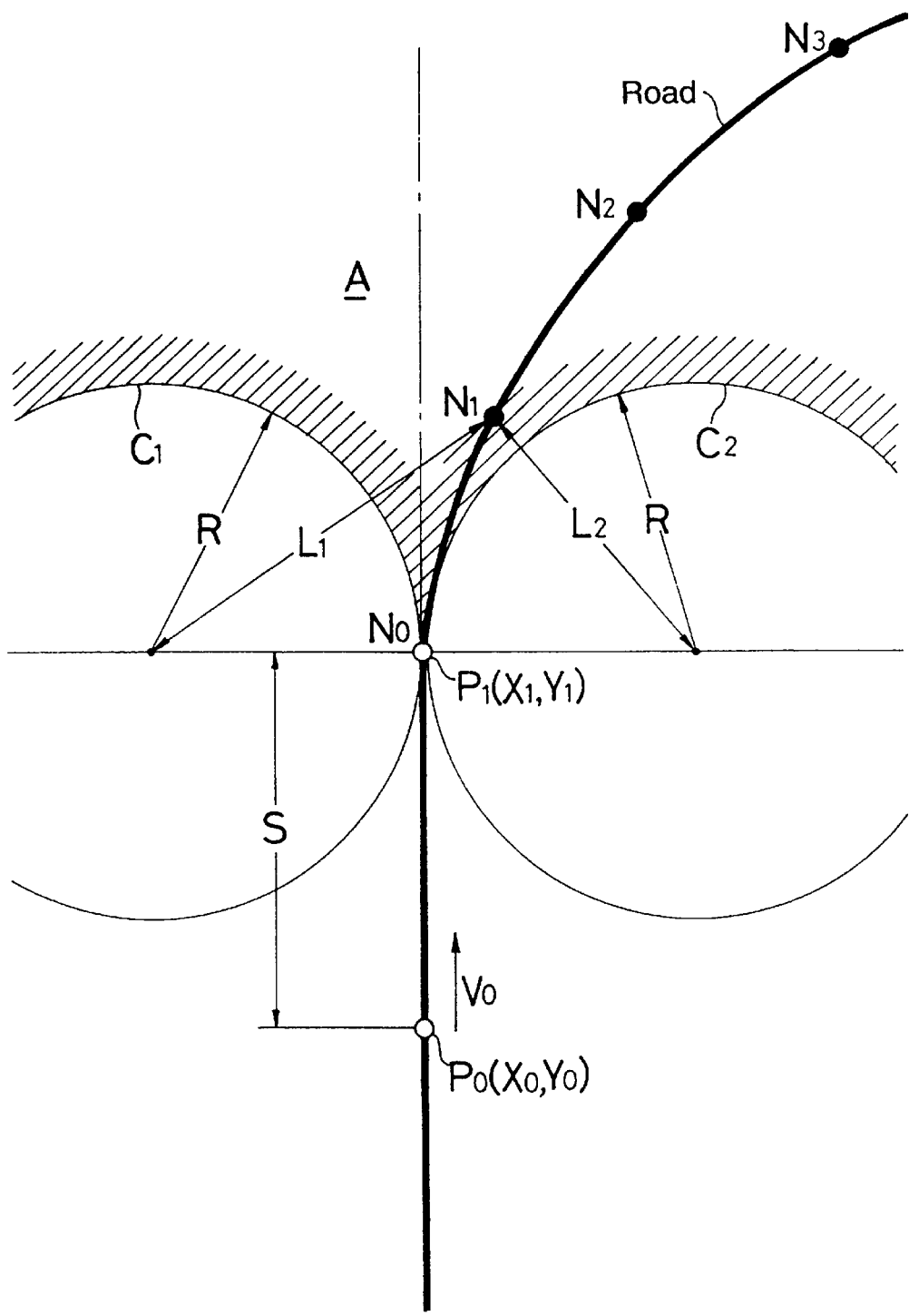
FIG. 22 is a diagram for explaining the operation when a road lies within a passable area.
Figure 23:
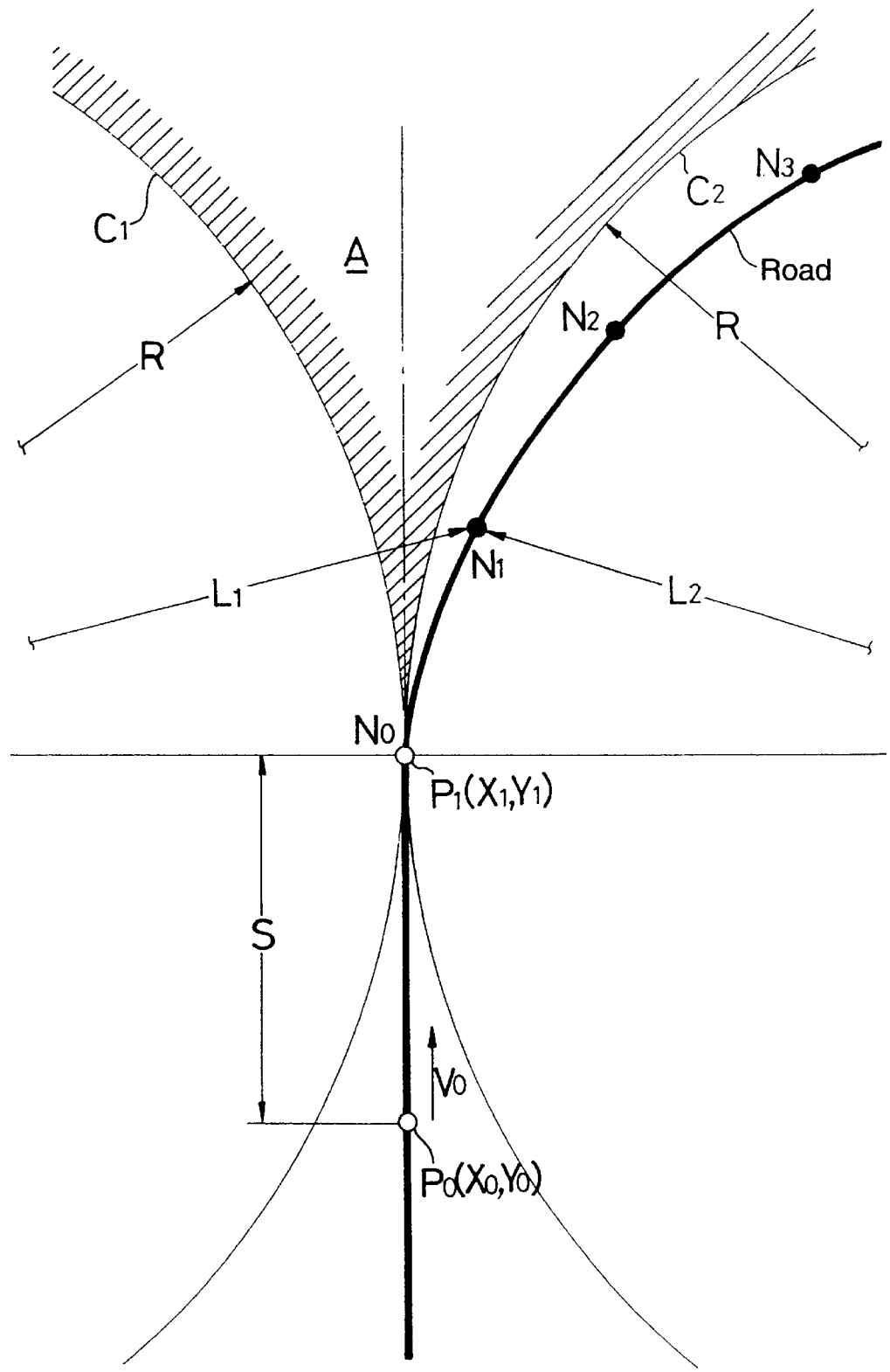
FIG. 23 is a diagram for explaining the operation when a road lies outside the a passable area.

Whether the nodes N exist either inside or outside the passable area A is determined in the following manner: If both of distances $L_1$ and $L_2$ between the centers of the two circular arcs $C_1$ and $C_2$ of the radius R and the nodes N are larger than the radius R, as shown in FIG. 22, it is determined that the nodes N exist inside the passable area A, and that the subject vehicle can pass through the nodes N at the current speed $V_0$. On the other hand, if one of the distances $L_1$ and $L_2$ (e.g., $L_2$) between the centers of the two circular arcs $C_1$ and $C_2$ of the radius R and the nodes N is smaller than the radius R, as shown in FIG. 23, it is determined that the nodes N exist outside the passable area A, and that the subject vehicle can pass through the nodes N at the current speed $V_0$.

Figure 24:
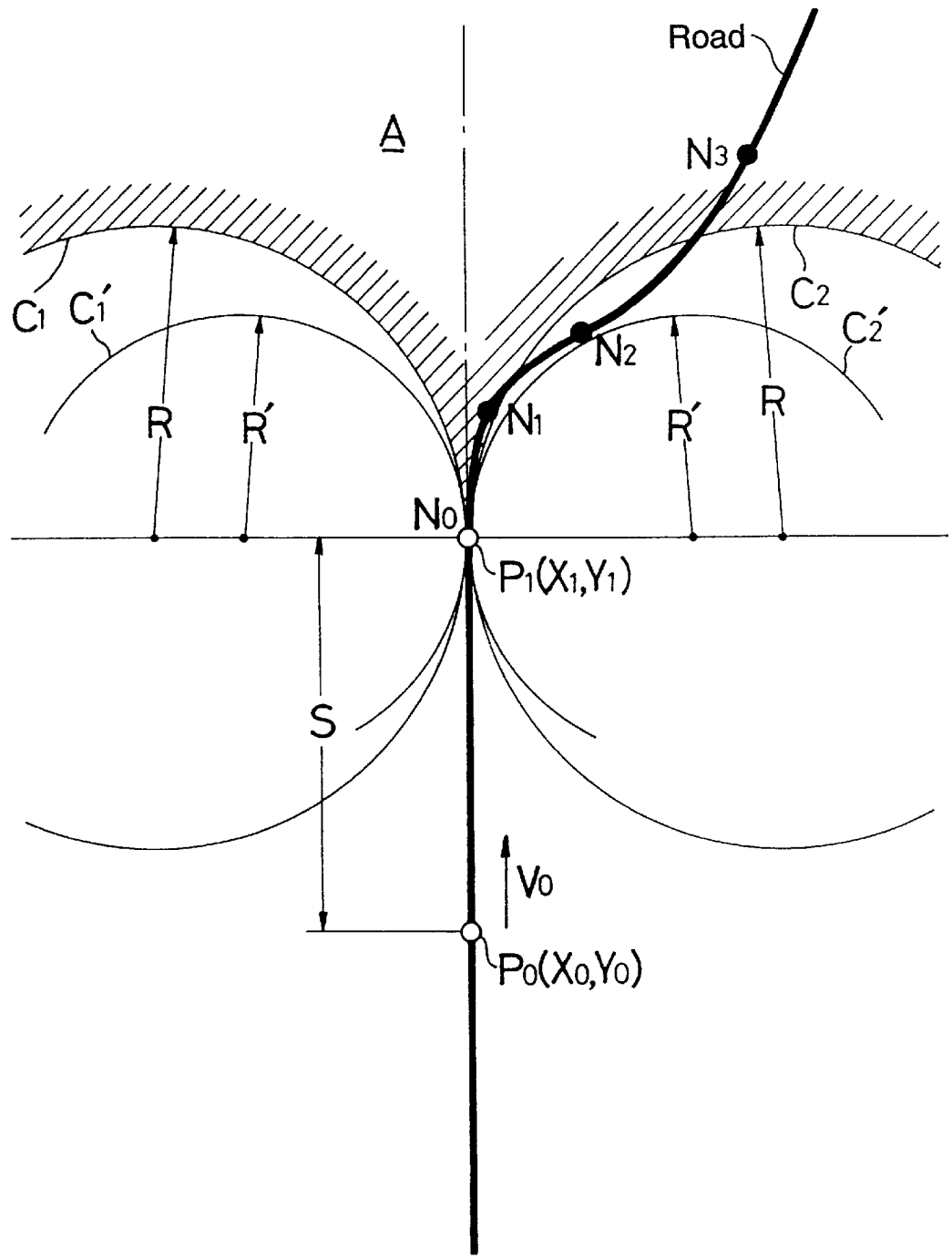
FIG. 24 is a diagram for explaining a method for determining a passable vehicle speed.

For example, even if the nodes $N_1$ and $N_3$ exist inside the passable area A, if the node $N_2$ exists outside the passable area A, as shown in FIG. 24, the vehicle cannot pass through the curve at a vehicle speed $V_0$ left intact. Therefore, to permit the vehicle to pass through the curve at the current vehicle speed $V_0$, it is required that all the nodes N exist inside the passable area A.

Now, when it has been determined at step S27 that the vehicle cannot pass through the curve, a maximum turning radius R' required for the subject vehicle to pass through the curve is calculated (at step S28). The maximum turning radius R' is set as a radius R' of circular arcs $C_1'$ and $C_2'$ as larger as all the nodes do not exist inside the circular arcs $C_1'$ and $C_2'$ (see FIG. 24). Therefore, if the vehicle speed of the subject vehicle is reduced to a level enable the vehicle to be turned at the maximum turnable radius R', the vehicle can pass through the curve.

Then, the vehicle speed enabling the vehicle to be turned at the maximum turnable radius R' is determined as a passable vehicle speed $V_{MAX}$ (at step S29), and the vehicle speed $V_0$ is reduced down to a level equal to or lower than the passable vehicle speed $V_{MAX}$ (at step S30). Thus, the vehicle can reliably pass through the curve.

If all the nodes N exist inside the passable area A, the vehicle can pass through the curve at the speed $V_0$ left intact and hence, the speed reduction by the vehicle speed regulating means 25 is not carried out.

In the manner, it is determined whether the vehicle can pass through the curve. If the vehicle cannot pass through the curve at the current speed, the subject vehicle is enabled to pass through the curve at a proper vehicle speed by conducting a speed reduction by the warning means 26 and the vehicle speed regulating means 25.

Figure 16:
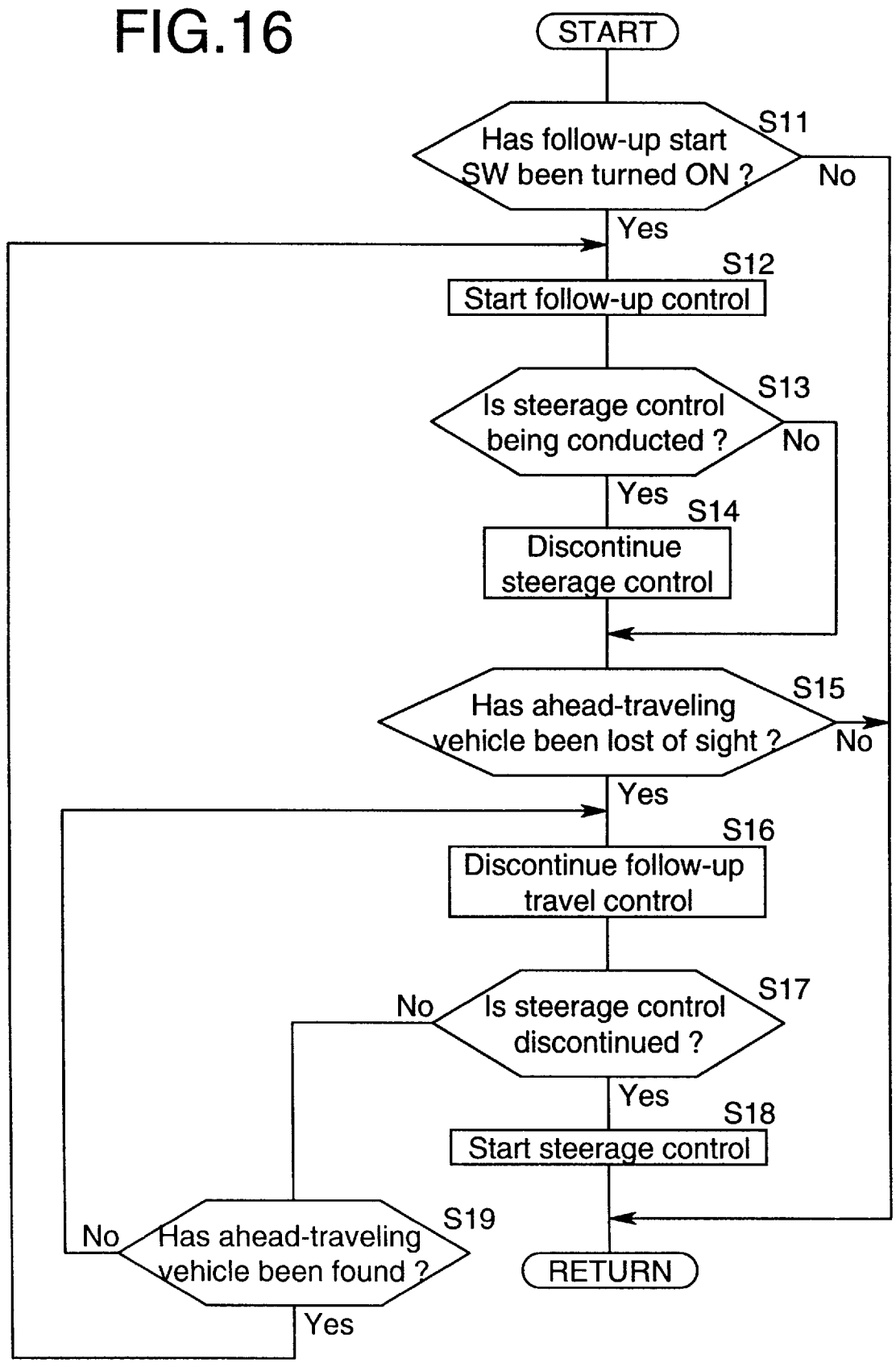
FIG. 16 is a flowchart of a follow-up travel control routine.
Figure 17:
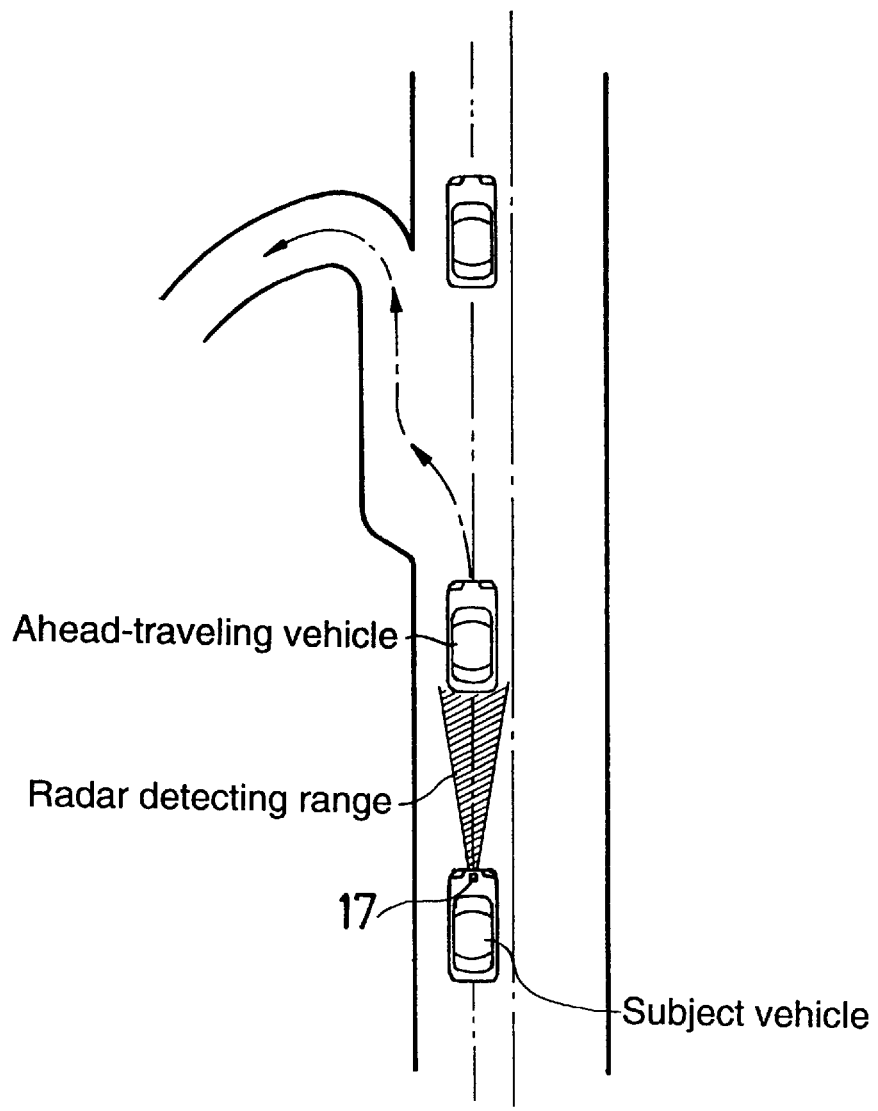
FIG. 17 is a diagram for explaining the operation during a follow-up travel control.

The function of the follow-up travel control section FC in the tenth embodiment has the vehicle speed control substituted for the steerage control in the flowchart in FIG. 16 illustrating the ninth embodiment. More specifically, when the follow-up travel control by the follow-up travel control section FC is started while the vehicle speed control by the cornering control section CC is being conducted in order to prevent the departing of the vehicle from the road in the curve, the vehicle speed control is automatically discontinued. When the ahead-traveling vehicle has been lost of sight during the follow-up travel control, thereby causing the follow-up travel control to be disenabled, the vehicle speed control is automatically restarted. Thus, it is possible to exhibit the functions of both the controls to the maximum without causing the drive to feel the incompatibility and the troublesomeness due to a mutual interference.

In the previously described ninth embodiment and the tenth embodiment, for example, a photographing or shooting means such as a camera can be employed in place of the radar sensor $S_6$. As for the steerage control section SC, any proper one can be employed if it is adapted to perform a steerage control in accordance with the road shape detected based the map information. Further, as for the cornering control section CC, any proper one can be employed if it is adapted to perform the regulation of the vehicle speed in accordance with the road shape detected based the map information.

Figure 25:
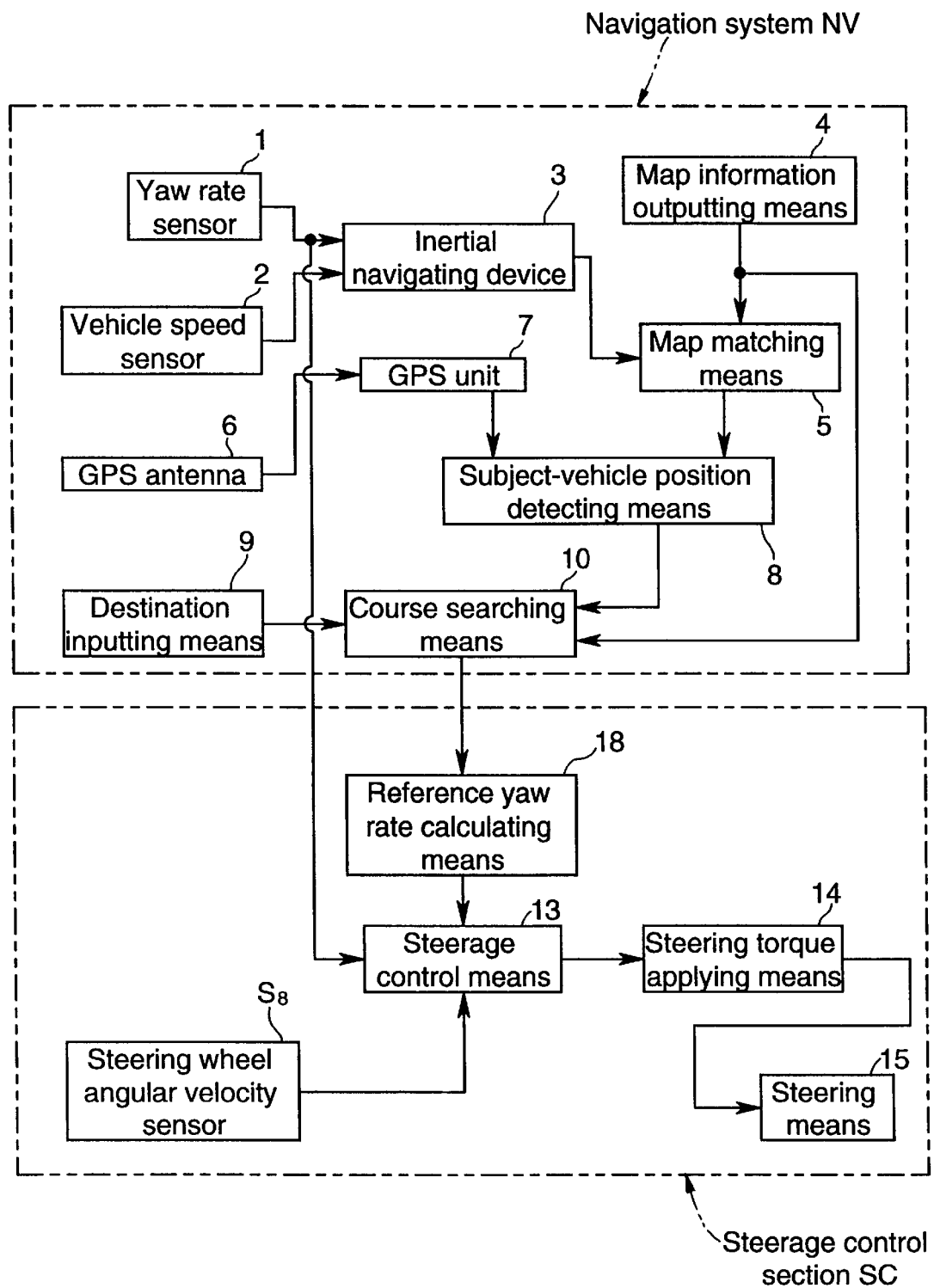
FIG. 25 is a block diagram showing the entire arrangement of a vehicle control system according to an eleventh embodiment of the present invention.

An eleventh embodiment of the present invention shown in FIG. 25 is substantially similar to the sixth embodiment, except that in place of the various sensors $S_2$ to $S_7$ connected to the control means 13 of the steerage control section SC in the sixth embodiment, a steering angular velocity sensor $S_8$ connected to the control means 13 is used. Other constructions are the same as in the sixth embodiment.

The operation of the eleventh embodiment will be described below with reference to a flow chart in FIG. 26. First, a position of a subject vehicle on a map and data of a road ahead of the subject-vehicle position are read by the navigation system NV (at step S1 and S2). Then, an azimuth change quantity $\theta$ of the road (i.e., an azimuth change quantity $\theta$ between a second node $N_2$ and a third node $N_3$) is calculated by the above-described technique shown in FIG. 3, and a reference yaw rate $\gamma_{REF}$ is calculated by dividing the azimuth change quantity $\theta$ by a time $\delta t$ required for the vehicle to travel from the second reference node $N_2$ to the third reference node $N_3$ (at step S4).

Then, an actual yaw rate $\gamma$ is read from the yaw rate sensor 1 (at step S5), and a deviation D ($=\gamma-\gamma_{REF}$) between the reference yaw rate $\gamma_{REF}$ determined at step S4 and the actual yaw rate $\gamma$ determined at step S5 (at step S6). A steerage assisting torque T ($=k_1\times D$) proportional to the deviation D is determined (at step S7). If the deviation D is positive, a steerage ssisting torque permitting the steering control wheel to be steered rightwardly is applied to the steering means 15, and if the deviation D is negative, a steerage ssisting torque permitting the steering control wheel to be steered leftwardly is applied to the steering means 15. (at step S8).

Figure 9:
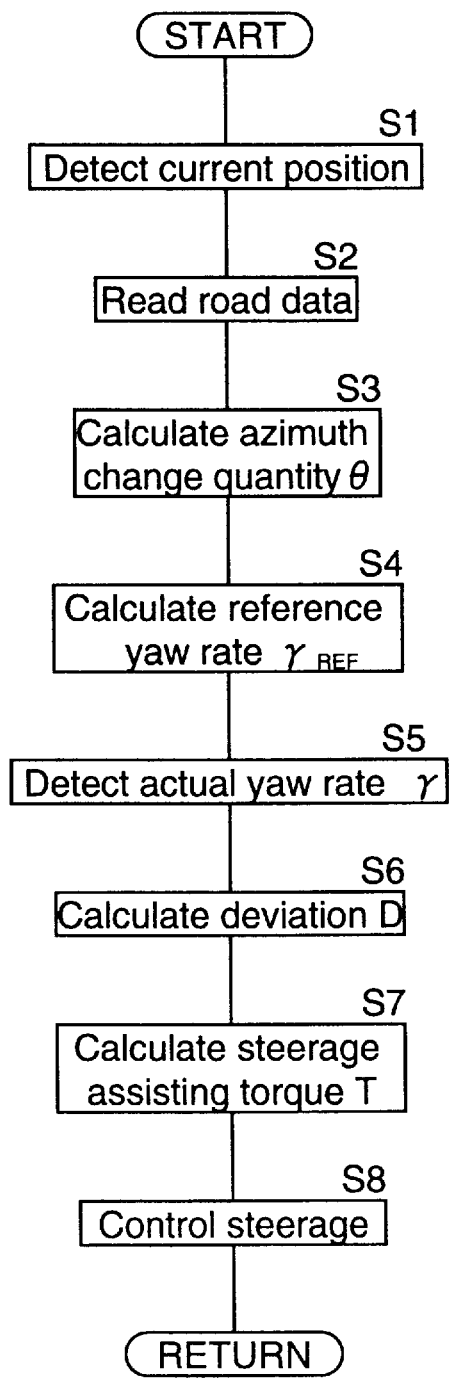
FIG. 9 is a flowchart of a steerage control routine.

The operations at steps S1 to S8 are the same as those in the sixth embodiment (see FIG. 9).

Figure 27:
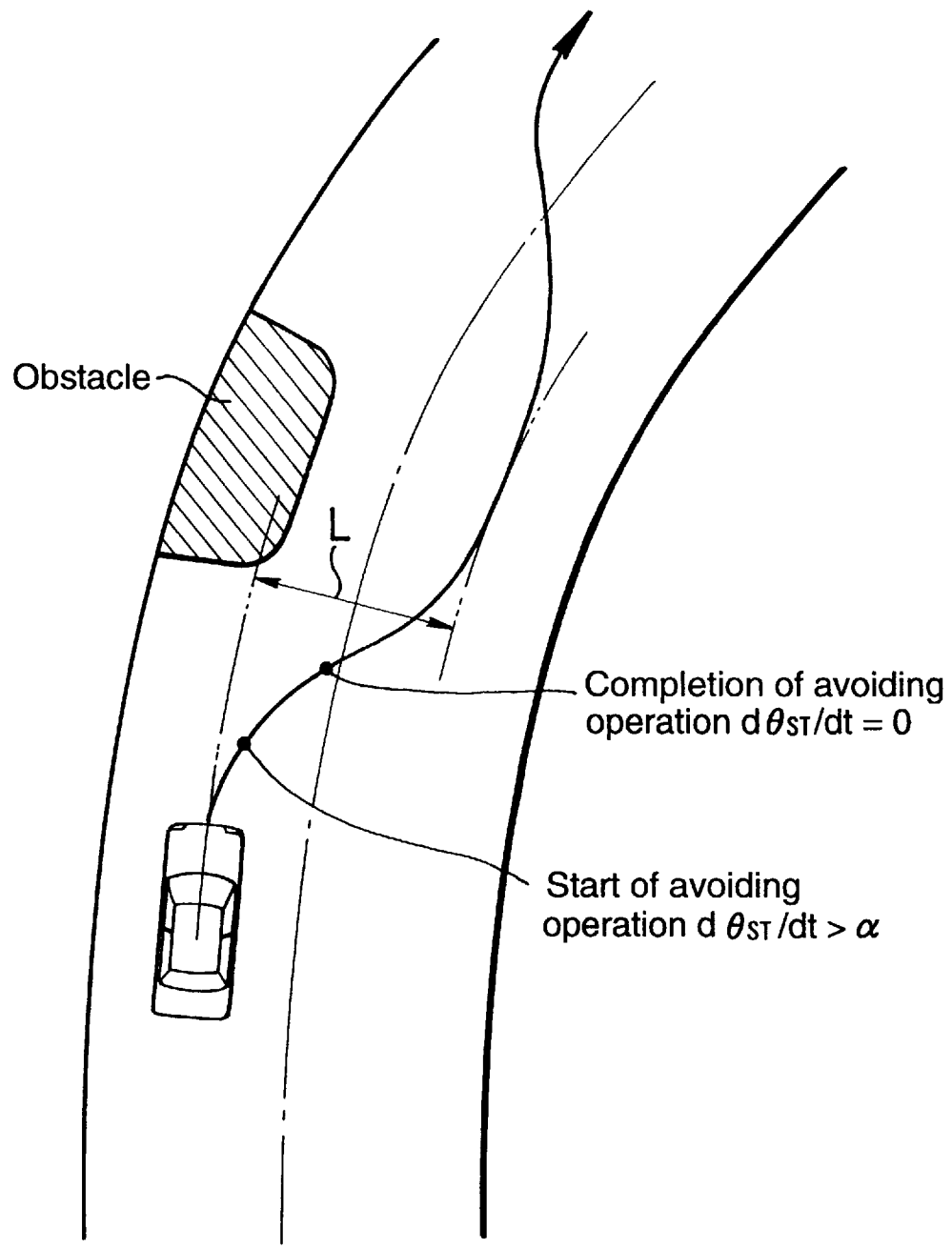
FIG. 27 is a diagram for explaining the operation when an obstacle is avoided.

Now, when the driver has found an obstacle ahead and has operated the steering wheel in order to avoid the obstacle, as shown in FIG. 27, if the steering angular velocity $d\theta_{ST}/dt$ detected by the steering angular velocity sensor 17exceeds a reference value $\alpha$, it is determined that the obstacle avoiding operation has been conducted (at step S9), and the steerage assisting torque T is corrected by a correcting quantity $\Delta T$ in order to assist the avoiding operation (at step S10). The correcting quantity $\Delta T$ is given by a product of a constant $k_2$ and the steering angular velocity $d\theta_{ST}/dt$ according to an equation, $\Delta T=k_2\times d\theta_{ST}/dt$. Therefore, the steerage assisting torque T during the obstacle avoiding operation is given according to the following equation:

$$T=(k_1\times D)-(k_2\times d\theta_{ST}/dt) \qquad (10)$$

which is corrected by subtracting the correcting quantity $\Delta T$ from the steerage assisting torque T ($=k_1\times D$) in a normal condition, which is proportional to the deviation D ($\gamma-\gamma_{REF}$) between the reference yaw rate $\gamma_{REF}$ and the actual yaw rate $\gamma$.

This will be further described. If the driver suddenly operates the steering wheel rightwardly in order to avoid an obstacle found ahead, when the vehicle is traveling, for example, on a rightwardly curved road as shown in FIG. 27, a rightward large actual yaw rate $\gamma$ is generated to produce a deviation D between such actual yaw rate $\gamma$ and a reference yaw rate $\gamma_{REF}$ based on a curvature of the road. As a result, a leftward steering torque $k_1\times D$ is applied to the steering means 15, so that the vehicle is intended to be restored to a correct course. However, this steering torque $k_1\times D$ is in a direction opposite from the direction of steering wheel operated by the driver to avoid the obstacle, resulting in an increased burden for driver's obstacle-avoiding operation.

Thereupon, in order to eliminate the leftward steering torque $k_1 \times D$ and to assist the rightward steerage conducted by the driver during the obstacle avoiding operation, the steering torque $k_1 \times D$ is corrected by the steering torque correcting quantity $k_2 \times d\theta_{ST}/dt$ in a reverse direction from the direction of the steering torque $k_1 \times D$. The negative sign in the equation (5) indicates that the correcting quantity $k_2 \times d\theta_{ST}/dt$ acts in a direction to eliminate the steering torque $k_1 \times D$. Thus, it is possible to easily and properly conduct the obstacle avoiding operation without interfering with the steerage control for preventing the departing of the vehicle from the road.

When the driver has returned the steering wheel to causes the steering angular velocity $d\theta_{ST}/dt$ to become 0 (zero), the value of the correcting quantity $k_2 \times d\theta_{ST}/dt$ also becomes 0 (zero) and thus, the obstacle avoiding operation is completed (at step S11).

It is also possible to assist a steerage for permitting the vehicle to be returned to an original travel lane with an appropriate timing after avoidance of the obstacle. In this case, a quantity of lateral movement of the vehicle for avoiding the obstacle, shown by L in FIG. 27, is previously calculated based on the yaw rate and the hysteresis of the vehicle speed during the obstacle avoiding operation, or based on the variation in current position of the vehicle by the navigation system. When the driver has operated the steering wheel or the winker in order to return the vehicle to the original travel lane, a steering torque corresponding to the lateral movement quantity L can be applied to assist the driver's returning operation.

A twelfth embodiment of the present invention will now be described with reference to FIGS. 28 and 29.

Figure 28:
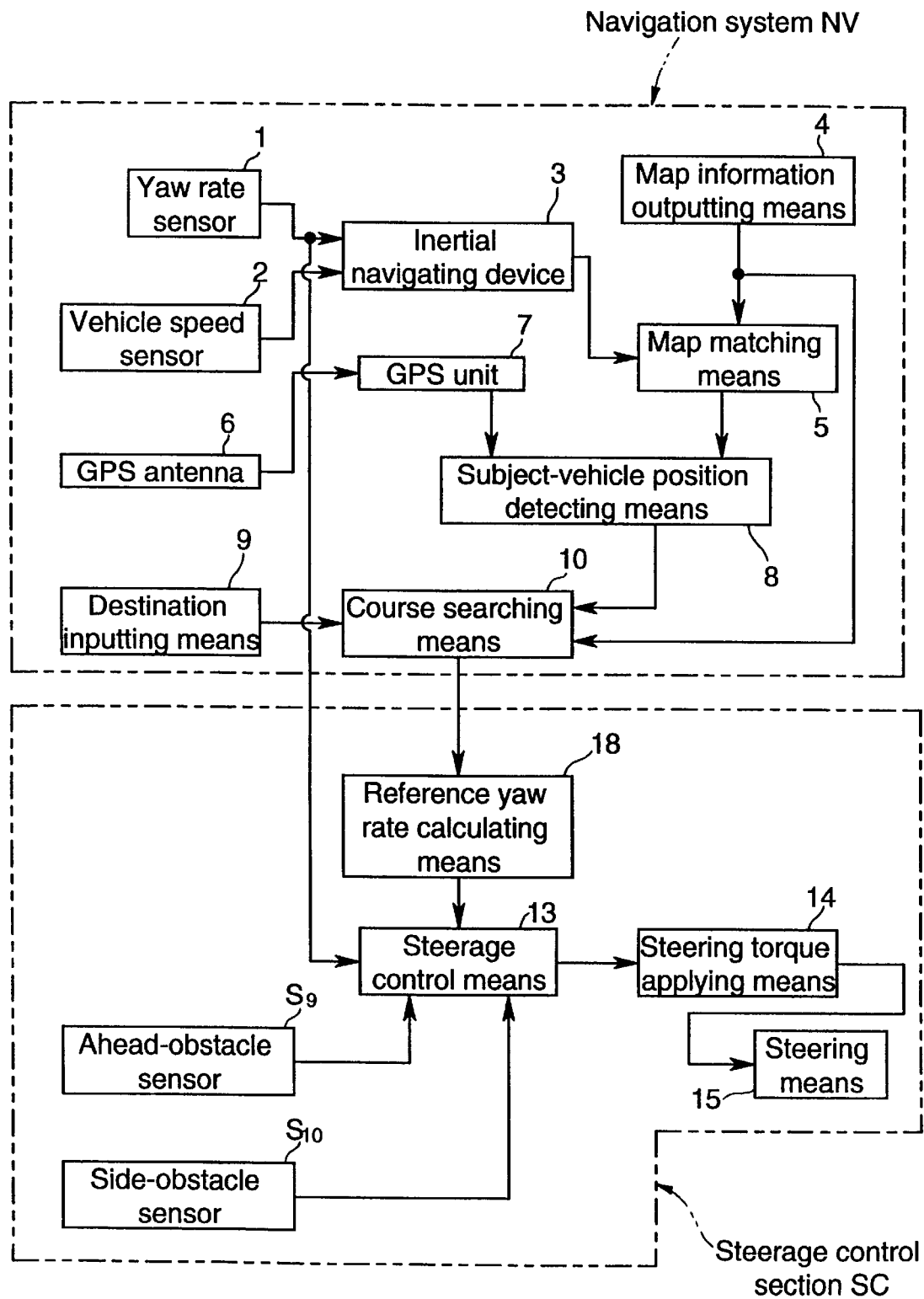
FIG. 28 block diagram showing the entire arrangement of a vehicle control system according to a twelfth embodiment of the present invention.

As shown in FIG. 28, a steerage control section SC in the twelfth embodiment includes a ahead-obstacle sensor $S_9$ comprised of a radar sensor for detecting an obstacle ahead of the subject vehicle, a side-obstacle sensor $S_{10}$ comprised of a radar sensor for detecting an obstacle existing sideways of the subject vehicle, in place of the steering angular velocity sensor $S_8$ used in the eleventh embodiment. Other constructions are the same as in the eleventh embodiment.

Figure 29:
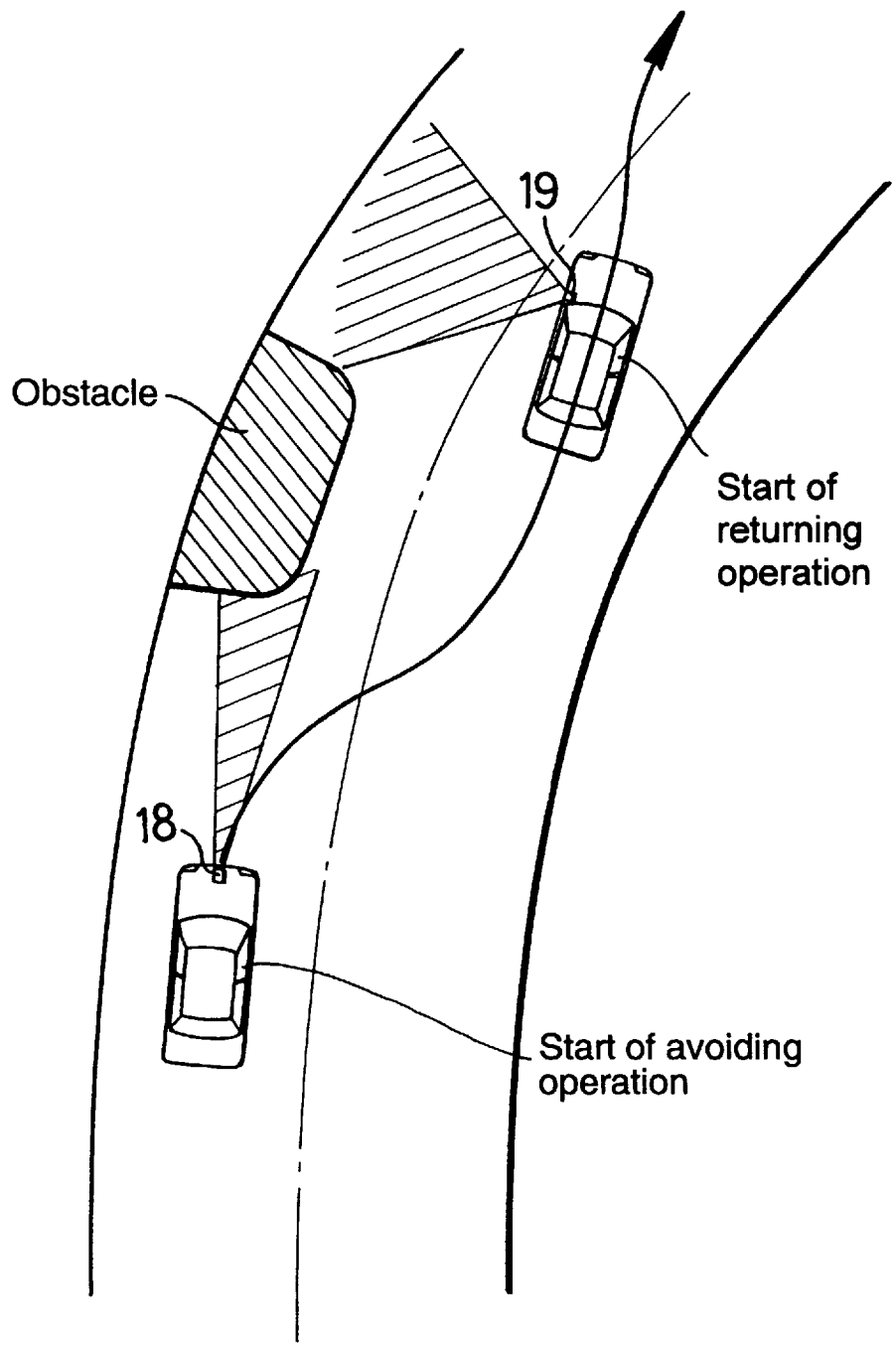
FIG. 29 is a diagram for explaining the operation when an obstacle is avoided.

As shown in FIG. 29, when an obstacle has been detected by the ahead-obstacle sensor $S_9$, the size of the obstacle and the distance between the subject vehicle and the obstacle, as well as if the latter is moving, the relative speed of the subject vehicle relative to the obstacle, are calculated. If there is a possibility that the subject vehicle may collide against the obstacle, the driver is informed of such possibility by an informing means such as a buzzer, a chime, a voice and the like, and the avoidance assisting for avoiding the obstacle is carried out.

The avoidance assisting is conducted by providing the correcting quantity $\Delta T$ in a direction to avoid the obstacle and correcting the steerage assisting torque T based on the deviation D ($\gamma-\gamma_{REF}$) between the reference yaw rate $\gamma_{REF}$ and the actual yaw rate $\gamma$, as in the eleventh embodiment. In the twelfth embodiment, however, the correcting quantity $\Delta T$ is determined by the size of the obstacle detected by the ahead-obstacle sensor $S_9$, the distance between the subject vehicle and the obstacle and the relative speed of the subject vehicle relative to the obstacle. Specifically, the larger the obstacle, the smaller the distance between the subject vehicle and the obstacle and the larger the relative speed of the subject vehicle relative to the obstacle (in other words, the subject vehicle is rapidly approaching to the obstacle), the larger the correcting quantity $\Delta T$ is set. This provides a reliable avoidance of the obstacle.

When the subject vehicle has reached a location sideways of the obstacle by the avoiding operation, the side-obstacle sensor $S_{10}$ detects the obstacle in place of the ahead-obstacle sensor $S_9$. At this time, the driver is informed by an informing means such as a buzzer, a chime, a voice and the like to wait the returning of the subject vehicle to an original travel lane. When it is detected that the subject vehicle has reached a location ahead of the obstacle, the operation of the informing means is stopped to inform the driver the fact that the returning of the subject vehicle to the original travel lane is possible. Even when the driver conducts a steerage to cause the subject vehicle to return to the original travel lane, the returning operation is assisted by the correcting quantity $\Delta T$ corresponding to the quantity L of lateral movement of the vehicle, as in the eleventh embodiment.

Each of the ahead-obstacle sensor $S_9$ and the side-obstacle sensor $S_{10}$ is not limited to the radar sensor and may be a photographing or shooting means such as a camera. The control for preventing the departing of the vehicle from the road is not limited to a control based on the deviation D between the reference yaw rate $\gamma_{REF}$ and the actual yaw rate $\gamma$, and a proper control can be employed.

What is claimed is:

1. A vehicle control system comprising:

a map information outputting means for outputting map information including a road on which a subject vehicle travels;

a subject-vehicle position detecting means for detecting a subject-vehicle position on a map;

a steering means for steering a steering control wheel of the vehicle;

a steering-torque applying means for applying a steering torque to said steering means;

means for determining an azimuth change quantity of the road on which the vehicle is traveling;

means for determining an azimuth change quantity of the vehicle;

means for determining a deviation between a determined azimuth change quantity of the road on which the vehicle is traveling and a determined azimuth change quantity of the vehicle, and for driving said steering-torque applying means such as to decrease said deviation;

a yaw rate detecting means for detecting a yaw rate of the vehicle; and a vehicle speed detecting means for detecting a vehicle speed, wherein
said azimuth change quantity of the vehicle is determined based on the yaw rate and the vehicle speed.

2. A vehicle control system comprising:

a map information outputting means for outputting map information including a road on which a subject vehicle travels;

a subject-vehicle position detecting means for detecting a subject-vehicle position on a map;

a steering means for steering a steering control wheel of the vehicle;

a steering-torque applying means for applying a steering torque to said steering means;

means for determining an azimuth chance quantity of the road on which the vehicle is traveling;

means for determining an azimuth change quantity of the vehicle;

means for determining a deviation between a determined azimuth change quantity of the road on which the vehicle is traveling and a determined azimuth change quantity of the vehicle, and for driving said steering-torque applying means such as to decrease said deviation;

a steering angle detecting means for detecting a steering angle of the steering control wheel of the vehicle; and a vehicle speed detecting means for detecting a vehicle speed, wherein said azimuth change quantity of the vehicle is determined based on the steering angle and the vehicle speed.

3. A vehicle control system according to any of claims 1 or 2, wherein when a driver of the vehicle changes a steering angular velocity of the steering control wheel by a predetermined value or more during operation of said steering torque applying means, the operation of said steering torque applying means is stopped.

4. A vehicle control system according to any of claims 2 or 3, wherein when a driver of the vehicle changes a torque of said steering control wheel by a predetermined value or more during operation of said steering-torque applying means, the operation of said steering-torque applying means is stopped.

5. A vehicle control system according to any of claims 2 or 3, wherein when a driver of the vehicle changes an accelerator opening degree of the vehicle by a predetermined value or more during operation of said steering-torque applying means, the operation of said steering-torque applying means is stopped.

6. A vehicle control system according to any of claims 1 or 2, wherein when a driver of the vehicle operates a brake of the vehicle during operation of said steering-torque applying means, the operation of said steering-torque applying means is stopped.

7. A vehicle control system according to any of claims 1 or 2, wherein when a driver of the vehicle operates a winker of the vehicle during operation of said steering-torque applying means, the operation of said steering-torque applying means is stopped.

8. A vehicle control system according to any of claims 1 or 2, further including a regulating means for regulating the steering torque of the steering torque applying means in accordance with a road district.

9. A vehicle control system comprising:

a map information outputting means for outputting map information including a road on which a subject vehicle travels;

a subject-vehicle position detecting means for detecting a subject-vehicle position on a map;

a steering means for steering a steering control wheel of the vehicle;

a steering-torque applying means for applying a steering torque to said steering means;

a reference yaw rate determining means for estimating a yaw rate generated during traveling of the vehicle based on the shape of a road ahead of the subject-vehicle position on the map to determine the estimated yaw rate as a reference yaw rate of the vehicle;

actual yaw rate detecting means for detecting an actual yaw rate of the vehicle; and a control means for determining a deviation between the reference yaw rate and the actual rate, and for controlling said steering-torque applying means such as to decrease said deviation.

10. A vehicle control system according to claim 9, wherein when a driver of the vehicle changes a steering angular velocity of the steering control wheel by a predetermined value or more during operation of said steering-torque applying means, the operation of said steering-torque applying means is stopped.

11. A vehicle control system according to claim 9, wherein when a driver of the vehicle changes a steering torque of the steering control wheel by a predetermined value or more during operation of said steering-torque applying means, the operation of said steering-torque applying means is stopped.

12. A vehicle control system according to claim 9, wherein when a driver of the vehicle changes an accelerator opening degree of the vehicle by a predetermined value or more during operation of said steering-torque applying means, the operation of said steering-torque applying means is stopped.

13. A vehicle control system according to claim 9, wherein when a driver of the vehicle operates a brake of the vehicle during operation of said steering-torque applying means, the operation of said steering-torque applying means is stopped.

14. A vehicle control system according to claim 9, wherein when a driver of the vehicle operates a winker of the vehicle during operation of said steering-torque applying means, the operation of said steering-torque applying means is stopped.

15. A vehicle control system according to claim 9, wherein when the driver does not grasp the steering control wheel during operation of said steering torque applying means, the operation of said steering torque applying means is stopped.

16. A vehicle control system according to claim 9, further including a regulating means for regulating the steering torque of the steering torque applying means in accordance with a road district.

17. A vehicle control system comprising:

a map information outputting means for outputting map information including a road on which a subject vehicle travels;

a subject-vehicle position detecting means for detecting a subject-vehicle position on a map;

a steering means for steering a steering control wheel of the vehicle;

a steering-torque applying means for applying a steering torque to the steering means;

a steering angular velocity detecting means for detecting a steering angular velocity input to said steering means; and a steerage control means which determines a steering-torque application quantity based on a traveling state of the vehicle and a shape of a road ahead of said subject-vehicle position on the map to drive said steering-torque applying means, and which corrects said steering-torque application quantity when a steering angular velocity equal to or larger than a predetermined value is detected by said steering angular velocity detecting means.

18. A vehicle control system according to claim 17, wherein said steerage control means determines a correction quantity for the steering torque application quantity in accordance with said steering angular velocity when the steering angular velocity equal to or larger than the predetermined value is detected.

* * * * *

UNITED STATES PATENT AND TRADEMARK OFFICE
CERTIFICATE OF CORRECTION

PATENT NO : 5,854,987
DATED : 29 December 1998
INVENTOR(S): Hiroshi Sekine, Nobuyoshi Asanuma It is certified that error appears in the above-identified patent and that said Letters Patent is hereby corrected as shown below:

Column 1, after the title and before "BACKGROUND OF THE INVENTION",
    insert the following paragraph: --This is a continuation-in-part
    of co-pending application Serial No. 08/394,648, filed February
    22, 1995 (now U.S. Patent No. 5,661,650).--.

Column 2, line 46, change "toque" to --torque--.

Column 3, line numbered between 22 and 23, before the comma insert
    --is determined--;
        line 47, change "the an" to --the--;
        line 64, change "steering-toque" to --steering-torque--.

Column 6, line numbered between 44 and 45, change " a eighth" to
    --an eighth--;
        line 56, after "19" insert --is--;
        line 65, change "the a" to --a--.

Column 7, 7th line, after "28" insert --is a--;
        line 52, after "based" insert --on--.

Column 8, 28th line, change "distance a " to --distance $\underline{a}$--.

Column 9, line 35, after "YES" insert --to--.

Column 10, line 21, change "A21" to --S21--;
        line 48, change "node" to --nodes--.

Column 11, line 31, change "exceed" to --exceeds--;
        line 43, after "angular" insert --velocity--.

Column 12, line 52, change "SS3" to --S3--.

Column 13, line 11, change "assiting" to --assisting--;
        line 58, change "st step" to --at step--.

UNITED STATES PATENT AND TRADEMARK OFFICE
CERTIFICATE OF CORRECTION

PATENT NO : 5,854,987
DATED : 29 December 1998
INVENTOR(S): Hiroshi Sekine, Nobuyoshi Asanuma It is certified that error appears in the above-identified patent and that said Letters Patent is hereby corrected as shown below:

Column 14, line 24, change "pr" to --or--;
          line 63, after "now" insert --be--.

Column 15, line 2, change "includes" to --include--;
          line 24, after "connected" insert --to--.

Column 16, line 24, before the period insert --are detected--;
          line 57, change "node" to --nodes--.

Column 17, line 25, after "level" insert --to--;
          line 66, after "based" insert --on--.

Column 18, line 2, after "based" insert --on--;
          29th line, change "ssisting" to --assisting--;
          31st line, change "ssisting" to --assisting--.

Column 19, 13th line, change "causes" to --cause--;
          line numbered 33, change "includes a" to --includes an--.

Column 20, line 61, change "chance" to --change--.

Column 21, 17th-18th lines, change "2 or 3" to --1 or 2--;
          23rd-24th lines, change "2 or 3" to --1 or 2--.

Signed and Sealed this

Fourth Day of May, 1999

Attest:

Q. TODD DICKINSON

*Attesting Officer*     *Acting Commissioner of Patents and Trademarks*